US012656123B2

(12) United States Patent
 Kim et al.

(10) Patent No.: US 12,656,123 B2
(45) Date of Patent: Jun. 16, 2026

(54) METHOD AND ELECTRONIC DEVICE FOR ACTIVATING DISTANCE SENSOR

(71) Applicant: Samsung Electronics Co., Ltd., Suwon-si (KR)

(72) Inventors: Hyeonseong Kim, Suwon-si (KR); Minkyung Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/009,565

(22) Filed: Jan. 3, 2025

(65) Prior Publication Data

US 2025/0137787 A1 May 1, 2025

Related U.S. Application Data

(63) Continuation of application No. PCT/KR2023/007292, filed on May 26, 2023.

(30) Foreign Application Priority Data

Jul. 6, 2022 (KR) ........................ 10-2022-0083305
Aug. 31, 2022 (KR) ........................ 10-2022-0109916

(51) Int. Cl.
 *G01C 21/16* (2006.01)
 *G06F 3/01* (2006.01)

(52) U.S. Cl.
 CPC ..... *G01C 21/1652* (2020.08); *G01C 21/1656* (2020.08); *G06F 3/011* (2013.01); *G06F 3/012* (2013.01); *G06F 3/013* (2013.01)

(58) Field of Classification Search
 CPC ............................................. G06F 3/011–013
 See application file for complete search history.

(56) References Cited

U.S. PATENT DOCUMENTS 10,665,036 B1 * 5/2020 Ha ........................ G02B 27/017
10,719,993 B1 * 7/2020 Ha .......................... G06V 10/25
(Continued)

FOREIGN PATENT DOCUMENTS

JP 6399692 B2 10/2018
JP 2020-521992 A 7/2020
(Continued)

OTHER PUBLICATIONS

International Search Report dated Sep. 4, 2023 issued in International Patent Application No. PCT/KR2023/007292.
(Continued)

*Primary Examiner* — Patrick F Marinelli
(74) *Attorney, Agent, or Firm* — Jefferson IP Law, LLP

(57) ABSTRACT

An electronic device is provided. The electronic device includes a plurality of distance sensors, an inertial sensor, a camera, a display, memory storing one or more computer programs, and a processor operatively connected to the plurality of distance sensors, the inertial sensor, the camera module, the display module, and the memory, wherein the one or more computer programs include computer-executable instructions that, when executed by processor, cause the electronic device to: identify, using the inertial sensor, whether a user wearing the electronic device on their head is walking, detect, in response to the user walking, a head rotation amount of the user using the inertial sensor, obtain a plurality of images through the camera on the basis of satisfying a head rotation condition based on the head rotation amount, measure an angle between a movement direction of the user and a gaze direction of the user on the basis of the plurality of images that are obtained, and activate among the plurality of distance sensors, at least one first distance sensor corresponding to the movement direction, when the measured angle exceeds a threshold.

20 Claims, 15 Drawing Sheets

(56) References Cited

U.S. PATENT DOCUMENTS

| 10,726,765 | B2 | 7/2020 | Stoll et al. | |
| 10,957,112 | B2 | 3/2021 | Miranda et al. | |
| 11,539,926 | B2 * | 12/2022 | Yoon | G06F 3/013 |
| 11,709,360 | B2 | 7/2023 | Hu | |
| 12,171,711 | B2 * | 12/2024 | Littwitz | G06F 3/011 |
| 2014/0043212 | A1 | 2/2014 | Park et al. | |
| 2016/0034042 | A1 | 2/2016 | Joo | |
| 2016/0207539 | A1 | 7/2016 | Jung | |
| 2017/0083084 | A1 | 3/2017 | Tatsuta et al. | |
| 2017/0186236 | A1 | 6/2017 | Kawamoto | |
| 2019/0258058 | A1 | 8/2019 | Fortin-Deschenes et al. | |
| 2019/0332175 | A1 * | 10/2019 | Väänänen | G06V 20/20 |
| 2019/0347864 | A1 * | 11/2019 | Sou | G06F 3/048 |
| 2020/0202491 | A1 * | 6/2020 | Lin | G06T 7/30 |
| 2021/0027538 | A1 | 1/2021 | Bleyer et al. | |
| 2022/0210383 | A1 * | 6/2022 | Yoon | G06F 3/012 |
| 2022/0323285 | A1 * | 10/2022 | Littwitz | G09B 21/001 |
| 2022/0350559 | A1 | 11/2022 | Yoon et al. | |
| 2023/0020454 | A1 | 1/2023 | Shchur | |
| 2025/0137787 | A1 * | 5/2025 | Kim | G02B 27/0172 |
| 2025/0251790 | A1 * | 8/2025 | Cho | G06T 19/006 |

FOREIGN PATENT DOCUMENTS

| JP | 2021-534491 | A | 12/2021 |
| KR | 10-2016-0016540 | A | 2/2016 |
| KR | 10-1818906 | B1 | 1/2018 |
| KR | 10-1867915 | B1 | 7/2018 |
| KR | 10-2018-0114756 | A | 10/2018 |
| KR | 10-1952972 | B1 | 2/2019 |
| KR | 10-2020-0120948 | A | 10/2020 |
| KR | 10-2022-0045685 | A | 4/2022 |
| KR | 10-2022-0058194 | A | 5/2022 |
| WO | 2016/013269 | A1 | 4/2017 |

OTHER PUBLICATIONS

Kang et al, "Obstacle Detection and Alert System for G01S17/93 Smartphone AR Users", Proceedings of the 35th IEEE/ACM International Conference on Automated Software Engineering, ACM, 2 Penn Plaza, Suite 701 New YorkNY10121-0701USA, XP058936034, Nov. 12, 2019.
European Search Report Aug. 22, 2025, issued in European Application No. 23835689.3.

* cited by examiner

FIG. 4A

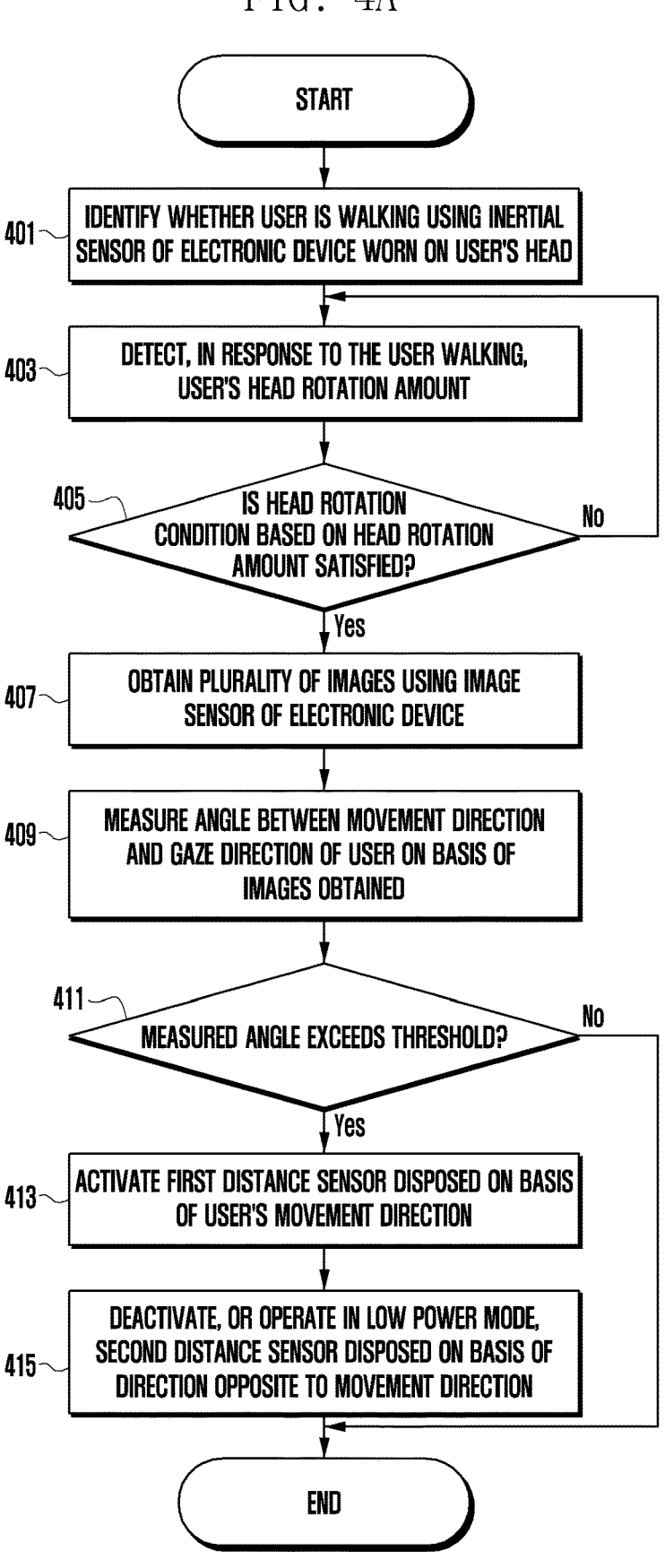

START

401 — IDENTIFY WHETHER USER IS WALKING USING INERTIAL SENSOR OF ELECTRONIC DEVICE WORN ON USER'S HEAD

403 — DETECT, IN RESPONSE TO THE USER WALKING, USER'S HEAD ROTATION AMOUNT

405 — IS HEAD ROTATION CONDITION BASED ON HEAD ROTATION AMOUNT SATISFIED?   No

Yes

407 — OBTAIN PLURALITY OF IMAGES USING IMAGE SENSOR OF ELECTRONIC DEVICE

409 — MEASURE ANGLE BETWEEN MOVEMENT DIRECTION AND GAZE DIRECTION OF USER ON BASIS OF IMAGES OBTAINED

411 — MEASURED ANGLE EXCEEDS THRESHOLD?   No

Yes

413 — ACTIVATE FIRST DISTANCE SENSOR DISPOSED ON BASIS OF USER'S MOVEMENT DIRECTION

415 — DEACTIVATE, OR OPERATE IN LOW POWER MODE, SECOND DISTANCE SENSOR DISPOSED ON BASIS OF DIRECTION OPPOSITE TO MOVEMENT DIRECTION

END

FIG. 7A

METHOD AND ELECTRONIC DEVICE FOR ACTIVATING DISTANCE SENSOR

CROSS-REFERENCE TO RELATED APPLICATION(S)

This application is a continuation application, claiming priority under 35 U.S.C § 365 (c), of an International application No. PCT/KR2023/007292, filed on May 26, 2023, which is based on and claims the benefit of a Korean patent application number 10-2022-0083305, filed on Jul. 6, 2022, in the Korean Intellectual Property Office, and of a Korean patent application number 10-2022-0109916, filed on Aug. 31, 2022, in the Korean Intellectual Property Office, the disclosure of each of which is incorporated by reference herein in its entirety.

BACKGROUND

1. Field

The disclosure relates to a method and electronic device for activating a distance sensor.

2. Description of Related Art

With the recent development of technology, an electronic device is gradually evolving from a uniform rectangular shape to a variety of shapes. For example, the electronic device is gradually evolving into a wearable electronic device that is wearable on a part of the human body to increase a user's convenience in using the electronic device.

The wearable electronic device may include a head mounted display (HMD) device that is wearable on the head, such as an eyeglasses-type wearable device. For example, the wearable electronic device may be an HMD device and include a video see-through (VST) device that takes pictures of an actual environment using a camera and displays the taken images in the form of overlapping virtual images. For example, the VST device may be worn on a user's head, and when worn, the display is disposed in a manner that corresponds to a position of the user's eyes.

The above information is presented as background information only to assist with an understanding of the disclosure. No determination has been made, and no assertion is made, as to whether any of the above might be applicable as prior art with regard to the disclosure.

SUMMARY

An HMD device worn on a user's head at least partially obscures a user's field of vision, which may make the user have difficulty accurately perceiving the surrounding environment. For example, the VST device corresponding to one of the HMD devices may not identify the actual surrounding environment with the user's eyes, but the user may identify the actual surrounding environment on the basis of images taken through a camera. As a result, the user identifies the surrounding environment within a relatively narrower range than the actual field of view. The user may identify a narrower range of surrounding environment than the actual field of view, and as the user moves, the user may collide with objects (e.g., things, obstacles) disposed in the surroundings.

Aspects of the disclosure are to address at least the above-mentioned problems and/or disadvantages and to provide at least the advantages described below. Accordingly, an aspect of the disclosure is to provide a method and electronic device for activating distance sensor.

Additional aspects will be set forth in part in the description which follows and, in part, will be apparent from the description, or may be learned by practice of the presented embodiments.

In accordance with an aspect of the disclosure, an electronic device is provided. The electronic device includes a plurality of distance sensors, an inertial sensor, a camera, a display, memory storing one or more computer programs, and a processor operatively connected to the plurality of distance sensors, the inertial sensor, the camera module, the display module, and the memory, wherein the one or more computer programs include computer-executable instructions that, when executed by the processor, cause the electronic device to: identify whether a user wearing the electronic device on their head is walking using the inertial sensor, detect, in response to the user walking, a head rotation amount of the user using the inertial sensor, obtain a plurality of images through the camera on the basis of satisfying a head rotation condition based on a head rotation amount, measure an angle between a movement direction of the user and a gaze direction of the user on the basis of the plurality of images obtained, and activate among the plurality of distance sensors, at least one first distance sensor corresponding to the movement direction, when the measured angle exceeds a threshold.

In accordance with another aspect of the disclosure, a method of activating a distance sensor in an electronic device is provided. The method includes identifying, using an inertial sensor, whether a user wearing the electronic device on the head is walking, detecting, in response to the user walking, a head rotation amount of the user using the inertial sensor, obtaining a plurality of images through a camera on the basis of satisfying a head rotation condition based on the head rotation amount, measuring an angle between a movement direction of the user and a gaze direction of the user on the basis of the plurality of images obtained, and activating, among the plurality of distance sensors, at least one first distance sensor corresponding to the movement direction when the measured angle exceeds a threshold.

In accordance with yet another aspect of the disclosure, one or more non-transitory computer-readable storage media storing one or more computer programs including computer-executable instructions that, when executed by one or more processors of an electronic device individually or collectively, cause the electronic device to perform operations are provided. The operations include identifying, using an inertial sensor, whether a user wearing the electronic device on their head is walking, detecting, in response to the user walking, a head rotation amount of the user using the inertial sensor, obtaining a plurality of images through a camera on the basis of satisfying a head rotation condition based on the head rotation amount, measuring an angle between a movement direction of the user and a gaze direction of the user on the basis of the plurality of images that are obtained, and activating, among a plurality of distance sensors, at least one first distance sensor corresponding to the movement direction when the measured angle exceeds a threshold.

In various embodiments of the disclosure, a plurality of distance sensors (e.g., distance detection sensors) are disposed on an electronic device (e.g., a VST device worn on a user's head), and at least one distance sensor corresponding to a movement direction can be activated in response to a situation in which the user is moving, and the occurrence of a collision with an object (e.g., an object, an obstacle)

disposed in a direction in which the user is moving can be predicted in advance on the basis of the activated distance sensor. The electronic device is activated at least one distance sensor to increase the accuracy of the collision prediction. The electronic device deactivates, or operate in a low power mode, at least one distance sensor with a relatively low possibility of a collision, and reduce the power consumption caused by driving the distance sensor.

According to various embodiments, the electronic device identifies a user's walking speed and ambient illuminance information, and adaptively adjust a threshold (e.g., a distance threshold) according to the collision prediction on the basis of the identified walking speed and illuminance information. The electronic device can be enhanced in the accuracy of predicting a collision with an object. The electronic device provides notification information according to the collision prediction in various ways.

Other aspects, advantages, and salient features of the disclosure will become apparent those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4A is a flowchart illustrating a method of activating and deactivating at least one distance sensor disposed in the electronic device, in a situation in which a user wearing the electronic device is walking according to an embodiment of the disclosure;

FIG. 7A illustrates various images displayed through a display module on the basis of a movement direction and a gaze direction according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS)

chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a micropro-cessor unit (MPU), a system on chip (SoC), an IC, or the like.

Figure 1:
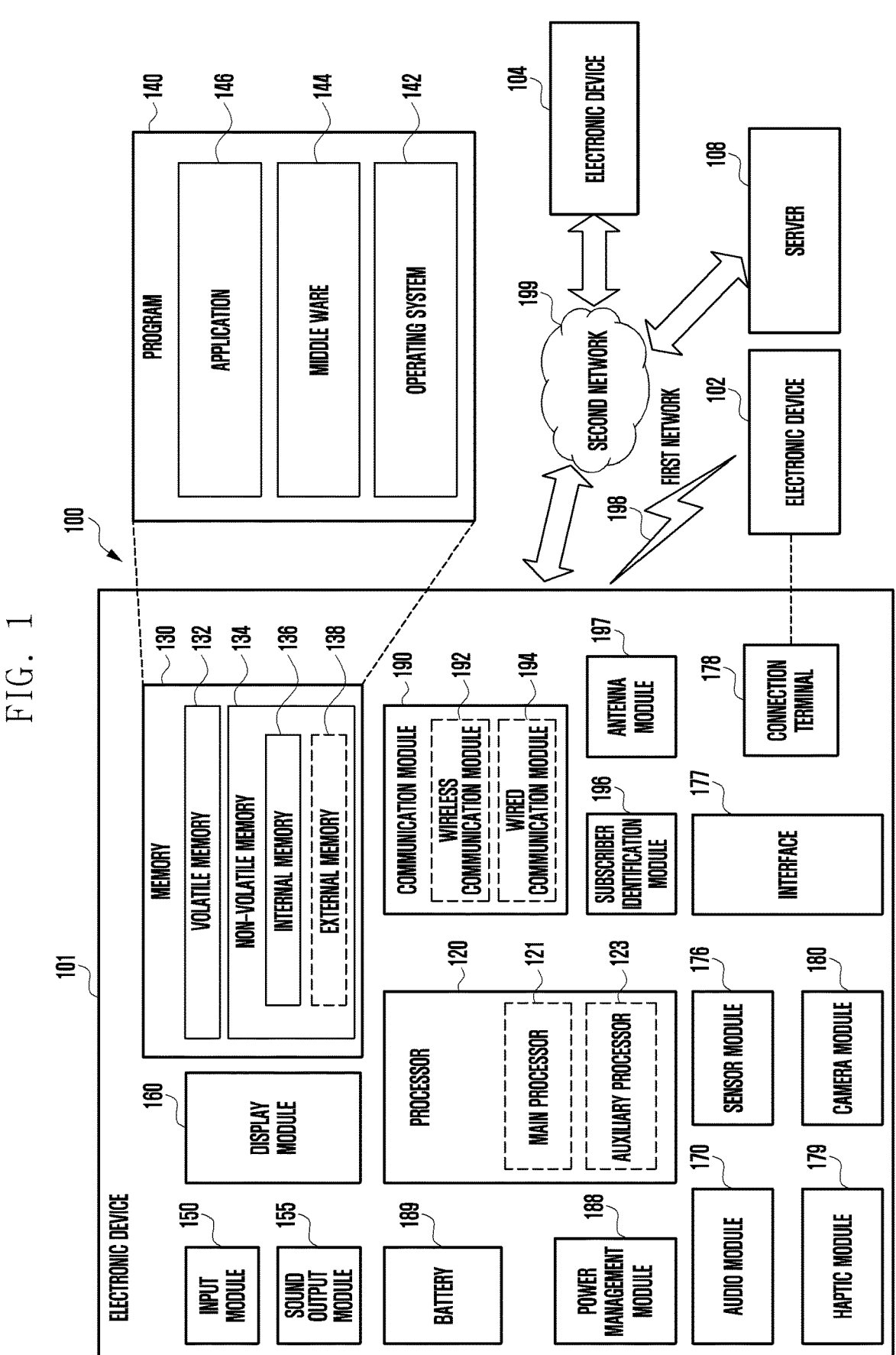
FIG. 1 is a block diagram of an electronic device in a network environment according to an embodiment of the disclosure.

FIG. 1 is a block diagram illustrating an example elec-tronic device 101 in a network environment 100 according to an embodiment disclosure.

Referring to FIG. 1, the electronic device 101 in the network environment 100 may communicate with an elec-tronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identifica-tion module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be imple-mented as a single component (e.g., the display module 160).

The processor 120 may execute, for example, software (e.g., a program 140) to control at least one other component (e.g., a hardware or software component) of the electronic device 101 coupled with the processor 120, and may per-form various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the commu-nication module 190) among the components of the elec-tronic device 101, instead of the main processor 121 while the main processor 121 is in an inactive (e.g., sleep) state, or together with the main processor 121 while the main pro-cessor 121 is in an active state (e.g., executing an application). According to an embodiment, the auxiliary processor 123 (e.g., an image signal processor or a communication processor) may be implemented as part of another compo-nent (e.g., the camera module 180 or the communication module 190) functionally related to the auxiliary processor 123. According to an embodiment, the auxiliary processor 123 (e.g., the neural processing unit) may include a hard-ware structure specified for artificial intelligence model processing. An artificial intelligence model may be gener-ated by machine learning. Such learning may be performed, e.g., by the electronic device 101 where the artificial intel-ligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide informa-tion to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodi-ment, the audio module 170 may obtain the sound via the input module 150, or output the sound via the sound output module 155 or a headphone of an external electronic device (e.g., an electronic device 102) (e.g., a speaker or a head-phone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
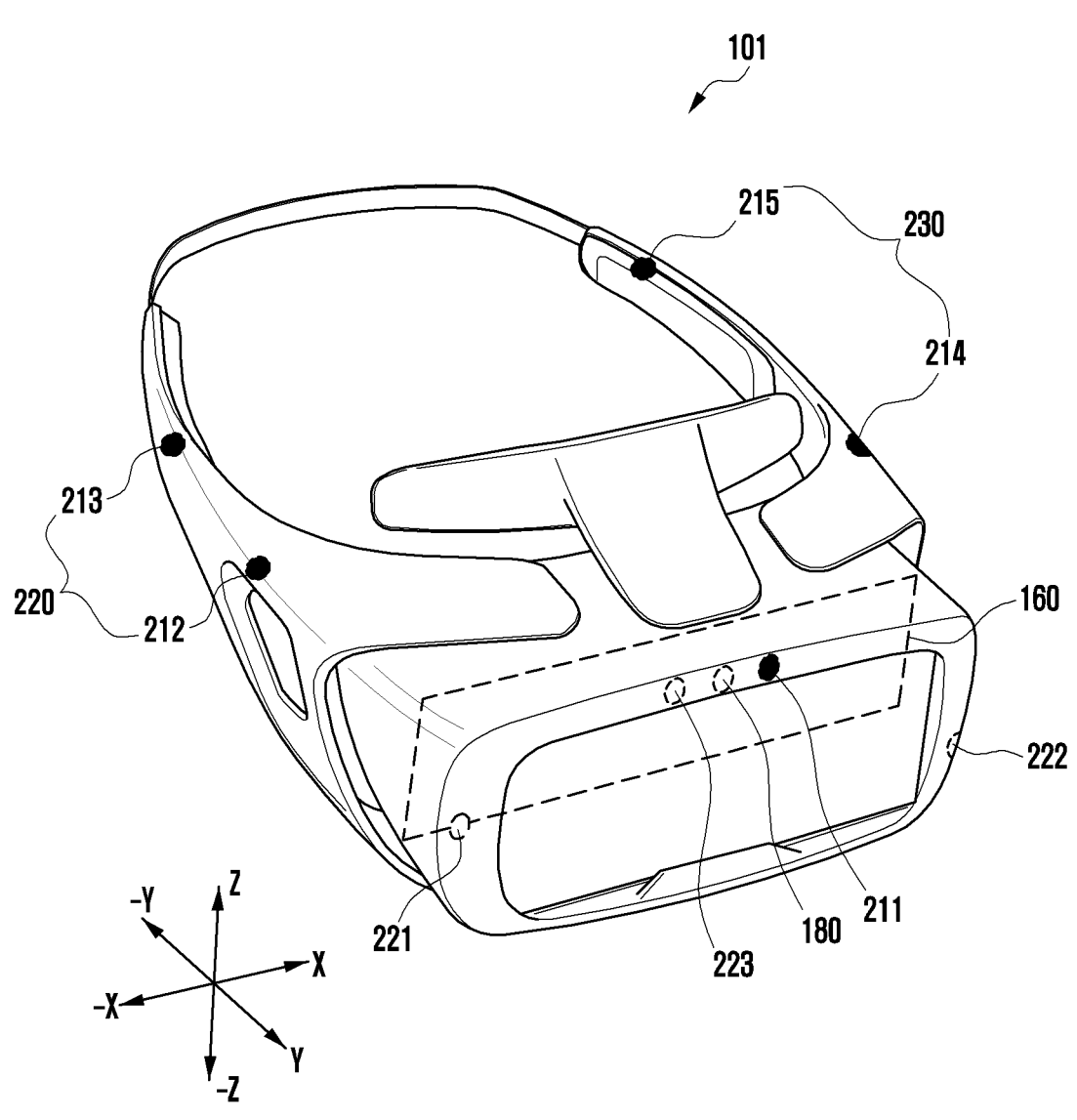
FIG. 2 is a view illustrating an example of an electronic device according to an embodiment of the disclosure.

FIG. 2 is a view illustrating an example of an electronic device according to an embodiment of the disclosure.

With reference to FIG. 2, when the electronic device (e.g., the electronic device 101 in FIG. 1) is a video see-through (VST) device corresponding to one of head mounted display (HMD) devices, such as an eyeglasses-type wearable device, the electronic device 101 may be worn on a user's head, and a display module (e.g., the display module 160 in FIG. 1) of the electronic device 101 may be disposed in correspondence to a position of a user's eye. The electronic device 101 may display an image taken using a camera (e.g., the camera module 180 in FIG. 1) through the display module 160. The camera 180 may be disposed to be directed in substantially the same direction as a user's gaze direction. For example, when a user wears the electronic device 101, the user may identify an actual surrounding environment on the basis of an image displayed through the display module 160 (e.g., an image taken using the camera 180), rather than identifying the actual surrounding environment with the eyes. According to an embodiment, a range of an image taken using the camera 180 may be relatively narrower than a range based on a user's actual field of view. According to an embodiment, the electronic device 101 may display an image through the display module 160 and further activate at least one distance sensor 211, 212, 213, 214, or 215 to predict the occurrence of a collision with an object disposed in the surroundings. For example, the electronic device 101 may identify a distance to an object, using at least one distance sensor 211, 212, 213, 214, or 215, and predict the occurrence of a collision depending on the distance to the object.

With reference to FIG. 2, it is illustrated that one camera 180 is disposed in correspondence to a frontal direction of the electronic device 101 (e.g., the +y direction, a user's gaze direction), but the number of cameras 180 is not limited. The camera 180 may include a left-eye camera corresponding to the left eye and a right-eye camera corresponding to the right eye. The camera 180 may be disposed to be directed in substantially the same direction as the user's gaze direction, and may take a picture of the surrounding environment with respect to the frontal direction of the electronic device 101. The electronic device 101 may include an illuminance sensor 223 for obtaining ambient illuminance information (e.g., brightness information). The electronic device 101 may include inertial sensors 221 and 222 (e.g., acceleration sensors, gyro sensors) for detecting a user's head motion (e.g., a state, position, location of the electronic device 101). The inertial sensors 221 and 222 may include a first inertial sensor 221 disposed at a right front side of the electronic device 101 (e.g., in the −x direction) and a second inertial sensor 222 disposed at a left front side of the electronic device 101 (e.g., in the +x direction).

With reference to FIG. 2, the electronic device 101 may include a plurality of distance sensors 211, 212, 213, 214, and 215 for identifying distances to objects (e.g., obstacles) disposed in the surrounding environment. For example, the distance sensors may include a first distance sensor 211 disposed in correspondence to a frontal direction (e.g., the +y direction) of the electronic device 101, a second distance sensor 220 (212 and 213) disposed in correspondence to a right direction (e.g., the −x direction) of the electronic device 101, and a third distance sensor 230 (214 and 215) disposed in correspondence to a left direction (e.g., the +x direction) of the electronic device 101. For example, the first distance sensor 211, the second distance sensor 220, and/or the third distance sensor 230 may be constituted in plurality.

According to an embodiment, the distance sensors 211, 220, and 230 may measure a distance to at least one object and may include at least one sensor of an infrared sensor, an ultrasonic sensor, and/or a light detection and ranging (LiDAR) sensor. The distance sensor may be implemented on the basis of at least one of an infrared sensor, an ultrasonic sensor, and/or a LiDAR sensor. According to an embodiment, the electronic device 101 may measure a distance to an object disposed in the surroundings using the distance sensors 211, 220, and 230, and in response to a situation in which the distance changes, may predict the occurrence of a collision with the object. For example, in a state in which a distance threshold for a distance to an object is configured, when a distance between the electronic device 101 worn on a user's head and the object is identified as being the distance threshold or less, the electronic device 101 may generate notification information that predicts a collision with the object. The electronic device 101 may provide notification information to a user in a variety of methods (e.g., a visual effect, an audible effect, or a tactile effect).

According to various embodiments, the electronic device 101 worn on a user's head may identify the user's movement direction (e.g., a walking direction, a direction in which the user is walking) using the inertial sensors 221 and 222, and may identify the user's gaze direction using the inertial sensors 221 and 222 and an image sensor (e.g., the camera module 180). The electronic device 101 may activate, or deactivate, the distance sensors 211, 220, and 230 in response to a situation in which the movement direction and the gaze direction do not match each other. For example, at least one first distance sensor disposed in correspondence to a movement direction may be activated, and at least one second distance sensor disposed in correspondence to a direction opposite to the movement direction may be deactivated.

For example, when a user is looking in a second direction (e.g., the −x direction, a right direction with respect to the electronic device 101) while walking in a first direction (e.g., the +y direction, a frontal direction with respect to the electronic device 101), the electronic device 101 may activate a distance sensor disposed in correspondence to the first direction (e.g., the +y direction) (e.g., a third distance sensor 230, a distance sensor disposed to the left with respect to the electronic device 101 when the user wearing the electronic device 101 on the head is in a state of having rotated the head in the second direction, a third-first distance sensor 214, and a third-second distance sensor 215). The electronic device 101 may activate the third distance sensor 230 to predict whether a user will collide with objects disposed in the surroundings, on the basis of a direction in which the user is moving (e.g., the first direction). Additionally, in a situation in which the user is looking in the second direction (e.g., the −x direction), the electronic device 101 may deactivate a distance sensor disposed in correspondence to a direction (e.g., the −y direction) opposite to a direction (e.g., the first direction) in which the user is moving (e.g., the second distance sensor 220, a distance sensor disposed to the right with respect to the electronic device 101, a second-first distance sensor 212, and a second-second distance sensor 213).

For another example, when a user is looking in a third direction (e.g., the +x direction, a left direction with respect to the electronic device 101) while walking in a first direction (e.g., the +y direction, a frontal direction with respect to the electronic device 101), the electronic device 101 may activate a distance sensor disposed in correspondence to the first direction (e.g., the +y direction) (e.g., a second distance sensor 220, a distance sensor disposed to the right with respect to the electronic device 101 when the user wearing the electronic device 101 on the head is in a state of having rotated the head in the third direction, a second-first distance sensor 212, and a second-second distance sensor 213). The electronic device 101 may activate the second distance sensor 220 to predict whether a user will collide with objects disposed in the surroundings, on the basis of a direction in which the user is moving (e.g., the first direction). Additionally, in a situation in which the user is gazing in the third direction (e.g., the +x direction), the electronic device 101 may deactivate a distance sensor disposed in correspondence to a direction (e.g., the −y direction) opposite to a direction (e.g., the first direction) in which the user is moving (e.g., the third distance sensor 230, a distance sensor disposed to the left with respect to the electronic device 101, a third-first distance sensor 214, and a third-second distance sensor 215).

According to an embodiment, the electronic device 101 may activate at least one distance sensor disposed in correspondence to a movement direction (e.g., a direction with a relatively high possibility of collision) in response to a situation in which a user is moving while looking in a specific direction. The electronic device 101 may enhance the accuracy of predicting a collision with an object disposed along the movement direction.

According to an embodiment, the electronic device 101 may deactivate at least one distance sensor disposed in correspondence to a direction opposite to a movement direction (e.g., a direction with a relatively low possibility of collision) in response to a situation in which a user is moving while looking in a specific direction. The electronic device 101 may deactivate at least one distance sensor to reduce power consumption related to driving the distance sensor.

Figure 3:
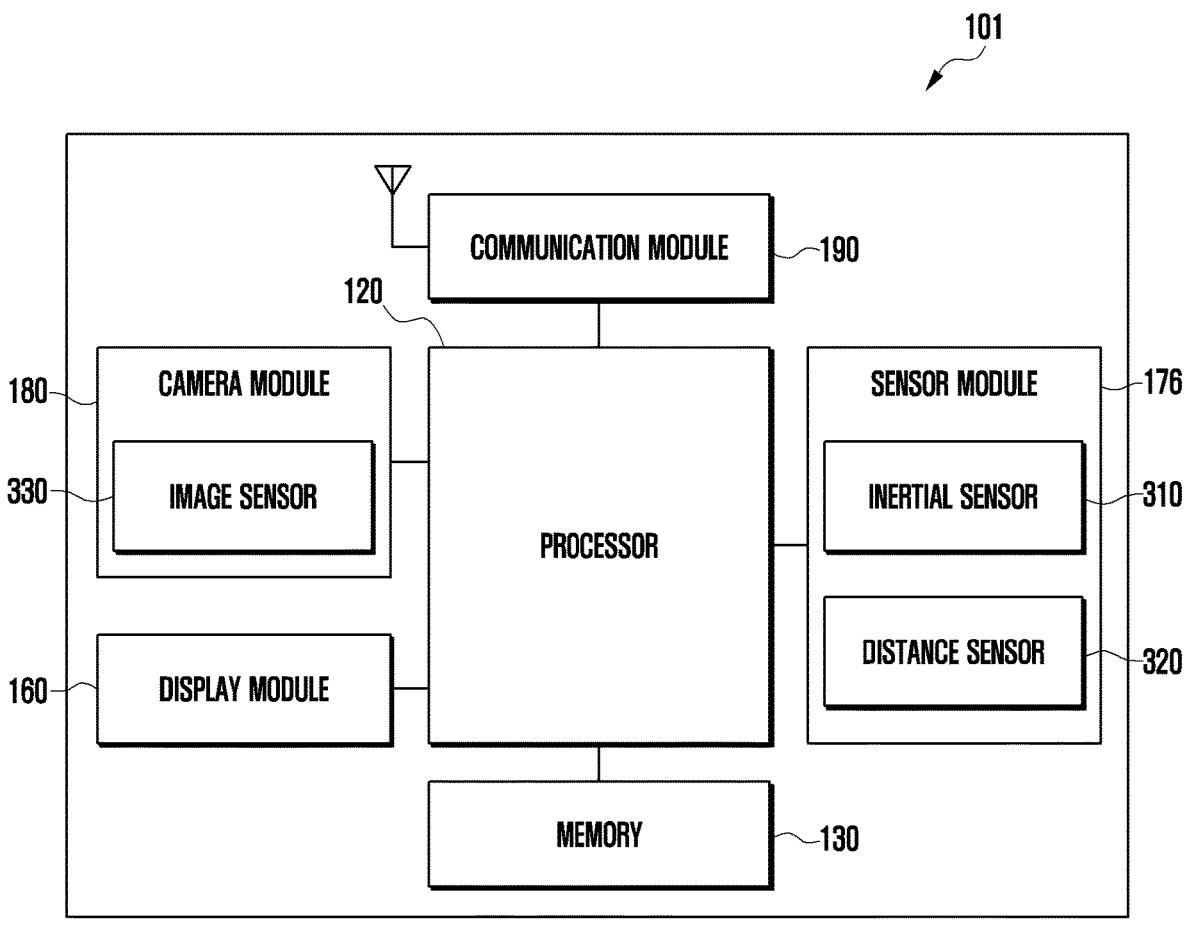
FIG. 3 is a block diagram illustrating the electronic device according to an embodiment of the disclosure.

FIG. 3 is a block diagram illustrating the electronic device according to an embodiment of the disclosure.

The electronic device 101 in FIG. 3 may be at least partially similar to the electronic device 101 in FIG. 1, or may further include other embodiments of the electronic device.

With reference to FIG. 3, an electronic device (e.g., the electronic device 101 in FIG. 1) may include a processor (e.g., the processor 120 in FIG. 1), memory (e.g., the memory 130 in FIG. 1), a display module (e.g., the display module 160 in FIG. 1), a sensor module (e.g., the sensor module 176 in FIG. 1), a camera module (e.g., the camera module 180 in FIG. 1), and/or a communication module (e.g., the communication module 190 in FIG. 1). According to an embodiment, the sensor module 176 may include an inertial sensor 310 to determine whether a user is walking and a distance sensor 320 to measure a distance to an object (e.g., an obstacle) disposed in the surroundings. According to an embodiment, the camera module 180 may include an image sensor 330 to convert and display a taken image as an image.

According to an embodiment, the electronic device 101 may include a video see-through (VST) device corresponding to one of head-mounted display (HMD) devices. The VST device is in the form of an electronic device worn on a user's head, in which the display module 160 may be disposed in correspondence to a position of the user's eyes. The VST device may take a picture of the surrounding environment using the camera module 180, and display the taken image through the display module 160. For example, the VST device may convert an image taken on the basis of an image sensor in the camera module 180, and output the converted image through the display module 160. The user may recognize the actual surrounding environment on the basis of the image displayed on the display module 160. According to an embodiment, the camera module 180 of the electronic device 101 may be disposed in the substantially same direction as a user's gaze direction. The electronic device 101 is worn in a fixed state on a user's head, and a direction in which the camera module 180 is pointing (e.g., a direction in which the camera module 180 is shooting, a user's gaze direction) may change on the basis of the user's head motion. According to an embodiment, a range of an image taken through the camera module 180 (e.g., an angle of view of the lens) may be relatively narrower than a range based on an actual field of view of a user.

According to an embodiment, the electronic device 101 may identify whether a user is walking and head motions using the inertial sensor 310 while displaying an image through the display module 160. For example, the electronic device 101 may identify whether a user is walking along a specific direction, and whether the user's head is fixed along the specific direction for a configured period of time. The electronic device 101 may activate, or deactivate, at least one distance sensor 320 on the basis of the identified walking state and head motion. For example, when an angle between a user's movement direction (e.g., a walking direction) and a direction of gaze at which the user is looking (e.g., a gaze direction) exceeds a configured threshold, the electronic device 101 may activate the first distance sensor disposed in a direction in correspondence to the movement direction and deactivate the second distance sensor disposed in a direction opposite to the movement direction.

According to an embodiment, the electronic device 101 may activate the first distance sensor disposed in correspondence to a direction with a relatively high possibility of a collision (e.g., a direction in which a user is walking, a direction in which the user is moving) to increase the accuracy of the collision prediction. According to an embodiment, the electronic device 101 may deactivate the second distance sensor disposed in correspondence to a direction with a relatively low possibility of collision (e.g., a direction opposite to a user's movement direction, a direction opposite to a direction in which the user is walking) to reduce power consumption of the electronic device 101.

According to an embodiment, the processor 120 of the electronic device 101 may execute a program stored in the memory 130 (e.g., the program 140 of FIG. 1) to control at least one other constituent element (e.g., a hardware or software constituent element), and may perform various data processing or calculations. The processor 120 may take images of the surroundings using the camera module 180, and may convert the images taken on the basis of the image sensor 330. The processor 120 may display the converted image through the display module 160, thereby providing the image to a user. The processor 120 may identify whether a user is walking and a rotation amount of the user's head using the inertial sensor 310 of the sensor module 176. The processor 120 may identify a user's movement direction and the user's gaze direction on the basis of a plurality of images taken through the camera module 180. The processor 120 may measure an angle difference between the movement direction and the gaze direction, and activate or deactivate at least one distance sensor 320 in response to the measured angle difference exceeding a configured threshold.

According to an embodiment, the memory 130 may store data related to predicting a collision with an external object (e.g., an obstacle) in the electronic device 101 and providing a notification to a user to avoid the collision. For example, the memory 130 may store at least one of data related to a user's walking, data related to the user's head rotation amount, data related to the user's movement direction, data related to the user's gaze direction, and/or data related to a distance to an object.

For example, in a state in which data related to walking, based on the inertial sensor 310 (e.g., gyro sensor, accelerometer) is stored in the memory 130, the processor 120 may measure data related to the motion of the electronic device 101 (e.g., the user's motion) using the inertial sensor 310 for a configured period of time. The processor 120 may compare the measured data to data related to walking stored in the memory 130 to identify whether the user is walking.

For example, in a state in which data related to a head rotation amount, based on the inertial sensor 310 (e.g., gyro sensor, acceleration sensor) is stored in the memory 130, the processor 120 may measure data related to the motion of the electronic device 101 (e.g., the user's head motion) using the inertial sensor 310 for a configured period of time. The processor 120 may compare the measured data to data related to the head rotation amount stored in the memory 130 to identify whether the user's head motion is in a fixed state for a designated period of time. For example, a user's head motion being fixed may include a state in which the user is looking in a predetermined direction.

For example, in a state in which data related to the movement direction and gaze direction, based on the image sensor 330, is stored in the memory 130, the processor 120 may obtain a plurality of images using the camera module 180, and may identify the user's movement direction and the user's gaze direction on the basis of the obtained plurality of images. The processor 120 may compare and analyze the data stored in the memory 130 and the data extracted on the basis of the plurality of images to determine the movement direction and gaze direction of the user. For example, the processor 120 may measure an angle between the movement direction and the gaze direction of the user, and may activate and/or deactivate at least one distance sensor in response to the measured angle exceeding a threshold.

For example, in a state in which data related to a distance to an object, based on the distance sensor 320, is stored in the memory 130, the processor 120 may measure a spaced distance from an object disposed in the surrounding environment using the distance sensor 320. For example, the processor 120 may determine that there is a possibility of a collision with an object when the measured distance is a configured threshold or less, and generate a notification signal to notify a user of a collision risk. The processor 120 may visually display the notification signal through the display module 160, tactilely provide the notification signal through an haptic module (e.g., the haptic module 179 in FIG. 1), and/or audibly provide the notification signal (e.g., output an audio signal) through an audio module (e.g., the audio module 170 in FIG. 1). According to an embodiment, the memory 130 may store data of a spaced distance from an object, a configured threshold, and/or configuration information (e.g., a visual effect, an audible effect, and a tactile effect) related to a notification signal.

According to an embodiment, the display module 160 may be disposed in correspondence to a position of a user's eyes in a situation in which the electronic device 101 is worn on the user's head. For example, when the electronic device 101 is worn, the display module 160 may be implemented in a form that is disposed adjacent to a position of a user's eyes, such as eyeglasses. The processor 120 may take a picture of the external surrounding environment using the camera module 180, and display the taken image through the display module 160. The taken image may be taken on the basis of an angle of view of the camera module 180. A user may identify the surrounding environment (e.g., objects and obstacles disposed in the surroundings) through the image displayed through the display module 160. According to an embodiment, the electronic device 101 may, in order to detect an object disposed in an area outside an angle of view of the camera module 180, activate at least one distance sensor 320 that detects an object in the area outside the angle of view.

According to an embodiment, the camera module 180 may be disposed to be directed in the substantially same direction as a user's gaze direction in a situation in which the user is wearing the electronic device 101 on the head. For example, the camera module 180 may take an image so that the image is similar to the surrounding environment that a user actually sees. According to an embodiment, a range of an image taken through the camera module 180 (e.g., an angle of view) may be relatively narrower than a range based on an actual field of view of a user. According to an embodiment, the camera module 180 may be constituted of a first camera corresponding to the left eye of a user and a second camera corresponding to the right eye of a user, and is not limited to the number of cameras.

According to an embodiment, the sensor module 176 may include the inertial sensor 310 (e.g., acceleration sensor, gyro sensor) to detect a user's head motion (e.g., a state, direction, position, or location of the electronic device 101), or to determine whether the user is walking. For example, the processor 120 may use the inertial sensor 310 to determine whether a user is looking in a specific direction, or whether the user is walking. The processor 120 may use the acceleration sensor included in the inertial sensor 310 to identify whether the user is walking at a constant speed. The processor 120 may use the gyro sensor included in the inertial sensor 310 to identify whether the user is walking while looking in a predetermined direction (without head rotation).

According to an embodiment, the sensor module 176 may include the distance sensor 320 to measure a spaced distance from an object disposed in the surroundings. The distance sensor 320 may be implemented on the basis of at least one sensor of an infrared sensor, an ultrasonic sensor, and/or a LiDAR sensor. The distance sensor 320 may include a directional sensor that is directed in a specific direction and may measure a spaced distance from an object (e.g., an obstacle) disposed in the specific direction. For example, the electronic device 101 (e.g., the electronic device 101 in FIG. 2), which is an eyeglass-type wearable device may include a first distance sensor (e.g., the first distance sensor 211 in FIG. 2) disposed in correspondence to a frontal direction (e.g., the +y direction in FIG. 2) that corresponds to the substantially same direction as a user's gaze direction, a second distance sensor (e.g., the second distance sensor 220 in FIG. 2) disposed in correspondence to a right direction of the electronic device 101 (e.g., the −x direction in FIG. 2), and a third distance sensor (e.g., the third distance sensor 230 in FIG. 2) disposed in correspondence to a left direction (e.g., the +x direction in FIG. 2) of the electronic device 101. According to an embodiment, a plurality of distance sensors 320 may be disposed in the electronic device 101, and the electronic device 101 is not limited to the number of distance sensors 320.

According to an embodiment, the communication module 190 may support, for example, establishing a direct (e.g., wired) communication channel between the electronic device 101 (e.g., an eyeglasses-type wearable device) and an external electronic device (e.g., a server, smartphone, personal computer (PC), personal digital assistant (PDA), and/or access point), or a wireless communication channel, and performing communications through the established communication channel. The communication module 190 may include one or more communication processors that support direct (e.g., wired) communication or wireless communication.

According to an embodiment, the electronic device 101 may obtain a plurality of images using the image sensor 330 on the basis of a user's walking state (e.g., whether the user is walking or stationary) and a head rotation amount (e.g., whether the user's gaze direction is fixed), and may measure an angle between the user's movement direction and the user's gaze direction (e.g., the gaze direction in which the user is looking) on the basis of the obtained plurality of images. When the measured angle exceeds a configured threshold, the electronic device 101 may activate the first distance sensor disposed in a direction in correspondence to the movement direction and deactivate the second distance sensor disposed in a direction opposite to the movement direction. For example, when the user is walking while looking in a direction other than the movement direction, the electronic device 101 may activate the first distance sensor disposed in correspondence to the movement direction in order to detect an object disposed along the movement direction. The electronic device 101 may detect, on the basis of the first distance sensor, an object disposed along the movement direction that has a relatively high possibility of collision. For another example, when an object is positioned in a direction opposite to the user's movement direction, the electronic device 101 may deactivate the second distance sensor disposed in correspondence to a direction opposite to the movement direction because the possibility of collision is relatively low.

According to various embodiments, an electronic device (e.g., the electronic device 101 in FIG. 1) may include a plurality of distance sensors (e.g., the first distance sensor 211 in FIG. 2, the second distance sensor 220, the third distance sensor 230, and the distance sensor 320 in FIG. 3), an inertial sensor (e.g., the inertial sensor 310 in FIG. 3), a camera module (e.g., the camera module 180 in FIG. 1), a display module (e.g., the display module 160 in FIG. 1), memory (e.g., the memory 130 in FIG. 1), and a processor (e.g., the processor 120 in FIG. 1) operatively connected to the plurality of distance sensors 320, the inertial sensor 310, the camera module 180, the display module 160, and the memory 130. The processor 120 may identify whether a user wearing the electronic device 101 on the head is walking using the inertial sensor 310. The processor 120 may detect, in response to the user being walking, the user's head rotation amount using the inertial sensor 310. The processor 120 may obtain a plurality of images through the camera module 180 on the basis of satisfying a head rotation condition based on a head rotation amount. The processor 120 may measure an angle between the user's movement direction and the user's gaze direction on the basis of the plurality of images obtained. The processor 120 may activate at least one first distance sensor corresponding to the movement direction, among the plurality of distance sensors 320, when the measured angle exceeds a threshold.

According to an embodiment, the electronic device 101 may include a head mounted display (HMD) device worn on a user's head, and the display module 160 may be disposed in correspondence to a position of the user's eyes.

According to an embodiment, the processor 120 may take an image through the camera module 180 along the substantially same direction as the user's gaze direction. The processor 120 may convert an image taken using an image sensor (e.g., the image sensor 330 in FIG. 3) of the camera module 180. The processor 120 may display the converted image through the display module 160.

According to an embodiment, the plurality of distance sensors 320 may measure a distance to an object disposed in an external environment, and may include at least one sensor from among an infrared sensor, an ultrasonic sensor, and a LiDAR sensor.

According to an embodiment, the processor 120 may deactivate, or operate in a low power mode, at least one second distance sensor corresponding to the direction opposite to the movement direction, from among the plurality of distance sensors 320 when the measured angle exceeds a threshold.

According to an embodiment, the plurality of images obtained may be divided into a plurality of blocks according to a predetermined pixel interval, and may include vector information extracted on the basis of the plurality of blocks.

According to an embodiment, the processor 120 may identify the movement direction and gaze direction on the basis of the vector information corresponding to the plurality of images. The processor 120 may measure an angle formed between the movement direction and the gaze direction.

According to an embodiment, the processor 120 may identify a distance to an object disposed along the movement direction using the activated at least one first distance sensor. The processor 120 may generate notification information when the identified distance is equal to or less than a distance threshold.

According to an embodiment, the electronic device 101 may further include an illuminance sensor. The processor 120 may measure a user's walking speed, using the inertial sensor 310. The processor 120 may obtain ambient brightness information using an illuminance sensor. The processor 120 may adjust the distance threshold on the basis of the walking speed and ambient brightness information.

According to an embodiment, the notification information may include at least one of an indication of a notification message, an indication of a guidance message, a visual effect, an audible effect, or a tactile effect.

According to an embodiment, the processor 120 may detect a user's head rotation amount using the inertial sensor 310 in response to the user not being walking. The processor 120 may obtain a plurality of images through the camera module 180 on the basis of satisfying a head rotation condition based on a head rotation amount. The processor 120 may identify a user's gaze direction on the basis of the plurality of images obtained. The processor 120 may activate at least one distance sensor of the plurality of distance sensor 320 on the basis of the identified gaze direction.

FIG. 4A is a flowchart illustrating a method of activating and deactivating at least one distance sensor disposed in the electronic device, in a situation in which a user wearing the electronic device is walking according to an embodiment of the disclosure.

In embodiments below, each operation may be performed sequentially, but is not required to be performed sequentially. For example, the order of each operation may be changed, and at least two operations may be performed in parallel.

According to an embodiment, it may be understood that operations 401 to 415 are performed on a processor (e.g., the processor 120 in FIG. 3) of an electronic device (e.g., the electronic device 101 in FIG. 3).

According to an embodiment, an electronic device (e.g., an eyeglasses-type wearable device, the electronic device 101 in FIG. 3, a video see-through (VST) device that is one of head mounted display (HMD) devices) may be worn on a user's head, and a display module (e.g., the display module 160 in FIG. 3) may be disposed in correspondence to a position of the user's eyes. The electronic device 101 may include a camera module (e.g., the camera module 180 in FIG. 3) that takes a picture of the surrounding environment on the basis of the substantially same direction as the user's gaze direction. For example, the electronic device 101 may display an image taken using the camera module 180 through the display module 160. A user with the electronic device 101 worn on the head may identify the surrounding environment corresponding to the gaze direction on the basis of the image displayed through the display module 160.

At operation 401, a processor (e.g., the processor 120 in FIG. 3) of the electronic device 101 may identify whether the user is walking using an inertial sensor (e.g., the inertial sensor 310 in FIG. 3) of the electronic device 101 worn on the user's head. For example, the processor 120 may identify a periodic signal pattern (e.g., a walking signal) on the basis of data obtained through the inertial sensor 310 (e.g., a gyro sensor, an acceleration sensor), and may determine a situation in which the user is walking based on the identified signal pattern.

At operation 403, the processor 120 may detect the user's head rotation amount in response to the user being walking. For example, the processor 120 may detect the head rotation amount on the basis of data obtained through the inertial sensor 310 (e.g., a gyro sensor, an acceleration sensor). The processor 120 may determine whether a situation is such that the user is looking in a specific direction, or the user is looking around. For example, when the head rotation amount falls within a configured range value, the user may be recognized as looking in a specific direction.

At operation 405, the processor 120 may identify whether the head rotation condition based on the head rotation amount is satisfied. For example, the head rotation condition may include a condition that the user looks in a specific direction for a designated period of time within a predetermined range. When the user is looking in a specific direction, the user's head rotation amount may be included in a configured range value (e.g., a threshold) or less. At operation 405, the processor 120 may identify whether the detected head rotation amount is equal to or less than a configured range value (e.g., a threshold). At operation 405, the head rotation condition being satisfied may be a situation in which the user is continuously looking in the second direction for a designated period of time while moving along the first direction.

At operation 405, when the head rotation condition is satisfied, at operation 407, the processor 120 may obtain a plurality of images using an image sensor (e.g., the image sensor 330 in FIG. 3) of the electronic device 101. For example, the processor 120 may perform a division operation (e.g., segmentation) on each of the plurality of images obtained, according to a predetermined pixel interval (e.g., area, size). Each of the plurality of images may include a plurality of blocks that are divided on the basis of a predetermined pixel interval (e.g., area, size). The processor 120 may extract vector information (e.g., motion-related vector information) for the plurality of images using a block matching method or an optical flow method, on the basis of the plurality of images that have been divided. In response to a situation in which the head rotation condition is satisfied at operation 405, the processor 120 may obtain a plurality of images that include vector information.

Meanwhile, at operation 405, when the head rotation condition is not satisfied, the processor 120 may repeatedly detect the user's head rotation amount at an occasion designated at operation 403. For example, the processor 120 may detect a plurality of head rotation amounts on a plurality of occasions. The head rotation condition not being satisfied may mean a situation in which the user is not looking in a specific direction for a designated period of time, but is instead looking around the surrounding environment.

At operation 409, the processor 120 may measure an angle between the user's movement direction and the user's gaze direction on the basis of the plurality of images obtained. For example, the processor 120 may determine the movement direction and the gaze direction using information on the magnitude and direction of the vector included in the extracted vector information, and may measure an angle (e.g., an angle difference) between the movement direction and the gaze direction. For example, the user's movement direction may mean a first direction in which a center point of a first image (e.g., a center position of a block with a minimum motion vector) is pointing and parallel to the ground, on the basis of the first image obtained, in a situation in which the user is looking in the same direction as the movement direction. The user's gaze direction may mean a second direction in which a center point of the second image (e.g., a center point of a block with a minimum motion vector) is pointing and parallel to the horizon, on the basis of the second image obtained in a situation in which the head rotation condition is satisfied. The processor 120 may measure an angle between the first direction and the second direction.

At operation 411, the processor 120 may identify whether the measured angle exceeds a designated threshold. For example, a situation in which the measured angle exceeds a designated threshold may include a situation in which the user is moving while looking in a different direction that does not match the movement direction. For example, when the movement direction is a frontal direction with respect to the electronic device 101, it may be a situation in which the user is moving along the frontal direction while looking in a left direction with respect to the electronic device 101 or a right direction with respect to the electronic device 101. It may be difficult for the user to visually identify an object disposed along the frontal direction of the electronic device 101. For example, when an object is disposed in an area that is outside the angle of view of the camera module 180, it may be difficult for the user to recognize the corresponding object. At operation 411, as long as the measured angle does not exceed a designated threshold, the electronic device 101 may not further activate the distance sensor. For example, a situation in which the measured angle does not exceed a designated threshold may mean that the user is looking in the substantially same direction as the movement direction.

When the angle measured at operation 411 exceeds a designated threshold, at operation 413, the processor 120 may activate the first distance sensor disposed on the basis of the user's movement direction. For example, since the user is walking while looking in a direction different from the movement direction, the user may have difficulty recognizing an object disposed along the movement direction. The processor 120 may activate at least one distance sensor disposed along the movement direction to recognize an object disposed along the movement direction. For example, when the user is walking while looking at the ground, the processor 120 may activate a distance sensor (e.g., the first distance sensor 211 in FIG. 2) disposed on the front of the electronic device 101. In this case, even if the user's gaze is directed to the ground, a collision with an object disposed in front of the user may be avoided. For another example, when the user is walking while looking in the left direction (e.g., the +y direction in FIG. 2) of the movement direction (e.g., the +x direction in FIG. 2), the processor 120 may activate a distance sensor (e.g., the second distance sensor 220 in FIG. 2) disposed on the right side (e.g., the −x direction in FIG. 2) of the electronic device 101. When the user is walking while looking in the right direction (e.g., the −x direction in FIG. 2) of the movement direction (e.g., the +y direction in FIG. 2), the processor 120 may activate a distance sensor (e.g., the third distance sensor 230 in FIG. 2) disposed on the left side (e.g., the +x direction in FIG. 2) of the electronic device 101. For another example, the second distance sensor 220 may be constituted in plurality (e.g., the second-first distance sensor 212 and the second-second distance sensor 213 in FIG. 2), and when the second distance sensor 220 is activated, the processor 120 may activate at least one distance sensor of the second-first distance sensor 212 or the second-second distance sensor 213 on the basis of the angle measured at operation 409.

According to an embodiment, the processor 120 may activate at least one distance sensor disposed in correspondence to an area that is difficult for the user to identify (e.g., an area that is out of the user's field of view, an area that is out of the range of the image displayed through the display module 160, or a movement direction when the user is moving in a direction different from a gaze direction). According to an embodiment, the electronic device 101 may detect a distance from an object disposed along an area that is difficult for the user to visually identify, and may predict the occurrence of a collision with the object. According to an embodiment, the electronic device 101 may have improved collision prediction accuracy for an object disposed in an external environment.

At operation 415, the processor 120 may deactivate, or operate in a low power mode, the second distance sensor disposed on the basis of a direction opposite to the movement direction. For example, the processor 120 may deactivate, or operate in a low power mode, at least one distance sensor disposed in correspondence to a direction opposite to the user's movement direction. Since an object disposed in a direction opposite to the movement direction will be relatively far away from the user (e.g., the possibility of collision with the object will be lower), the distance sensor disposed in correspondence to the opposite direction may be deactivated.

For example, when the user is walking while looking in the left direction (e.g., the +x direction in FIG. 2) of the movement direction (e.g., the +y direction in FIG. 2), the processor 120 may deactivate a distance sensor (e.g., the third distance sensor 230 in FIG. 2) disposed on the left side with respect to the electronic device 101. When the user is walking while looking in the left direction, a distance sensor disposed on the left side with respect to the electronic device 101 (e.g., the third distance sensor 230) may be a distance sensor disposed in correspondence to a direction opposite to the movement direction.

For another example, when the user is walking while looking in the right direction (e.g., the −x direction in FIG. 2) of the movement direction (e.g., the +y direction in FIG. 2), the processor 120 may deactivate a distance sensor (e.g., the second distance sensor 220 in FIG. 2) disposed on the right side with respect to the electronic device 101. When the user is walking while looking in the right direction, a distance sensor disposed on the right side with respect to the electronic device 101 (e.g., the second distance sensor 220) may be a distance sensor disposed in correspondence to a direction opposite to the movement direction.

According to an embodiment, the second distance sensor 220 may be constituted in plurality (e.g., the second-first distance sensor 212 and the second-second distance sensor 213 in FIG. 2), and when the second distance sensor 220 is deactivated, the processor 120 may deactivate at least one distance sensor of the second-first distance sensor 212 or the second-second distance sensor 213 on the basis of the angle measured at operation 409. In addition, even when the third distance sensor 230 is constituted in plurality (e.g., the third-first distance sensor 214 and the third-second distance sensor 215 in FIG. 2), and the third distance sensor 230 is deactivated, the processor 120 may deactivate at least one distance sensor of the third-first distance sensor 214 or the third-second distance sensor 215 on the basis of the angle measured at operation 409.

According to an embodiment, the processor 120 may deactivate at least one distance sensor disposed in correspondence to a direction (e.g., the –y direction in FIG. 2, a direction far away from the user) opposite to the user's movement direction (e.g., the +y direction in FIG. 2). According to an embodiment, since a direction opposite to the movement direction is a direction away from the user, the electronic device 101 may have a reduced possibility of a collision with an object disposed in correspondence to the opposite direction and may deactivate at least one distance sensor disposed in correspondence to the opposite direction. According to an embodiment, as at least one distance sensor is deactivated, power consumption due to driving the distance sensor may be reduced.

According to another embodiment, the electronic device 101 may activate at least one distance sensor on the basis of a state (e.g., a direction, a position, a location, and an angle) of the head on which the electronic device 101 is worn in a state in which the user is stationary. The electronic device 101 may activate at least one distance sensor disposed in correspondence to an area that is not displayed through the display module 160 (e.g., an area that is not visually identifiable to the user). For example, when the user is looking at the ground with the head down, the processor 120 may activate a distance sensor (e.g., the first distance sensor 211 in FIG. 2) disposed at the front of the electronic device 101 (e.g., the frontal direction in FIG. 2, the +y direction) and detect an object approaching toward the electronic device 101 from the front of the electronic device 101 using the activated distance sensor. According to another embodiment, the electronic device 101 may activate at least one distance sensor disposed in correspondence to an area that is not visually identifiable to the user. According to another embodiment, as at least one distance sensor is further activated, the accuracy of the collision prediction may increase.

Figure 4B:
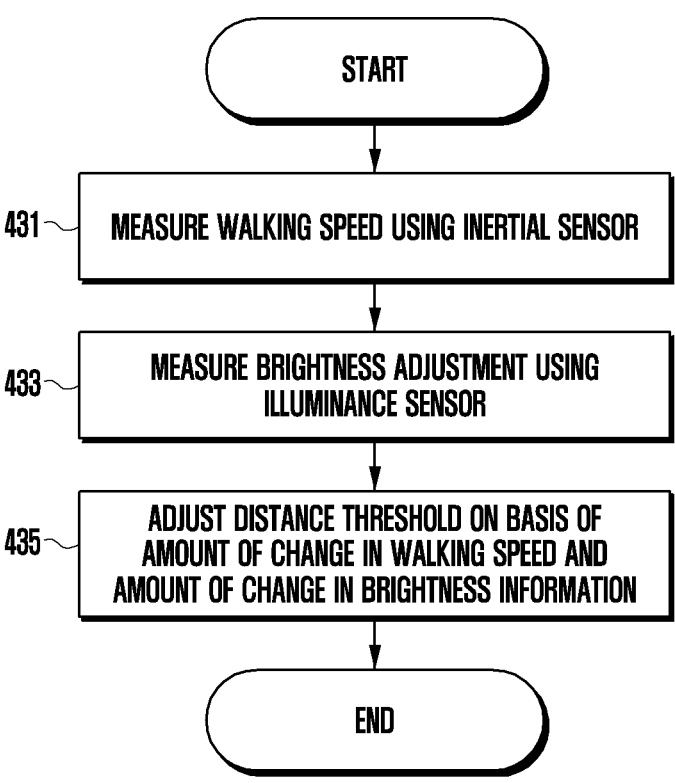
FIG. 4B is a flowchart illustrating a method of adjusting a threshold for a distance sensor on the basis of a user's walking speed and ambient brightness information, according to an embodiment of the disclosure.

FIG. 4B is a flowchart illustrating a method of adjusting a threshold for a distance sensor on the basis of a user's walking speed and ambient brightness information, according to an embodiment of the disclosure.

In embodiments below, each operation may be performed sequentially, but is not required to be performed sequentially. For example, the order of each operation may be changed, and at least two operations may be performed in parallel.

According to an embodiment, it may be understood that operations 431 to 435 are performed on a processor (e.g., the processor 120 in FIG. 3) of an electronic device (e.g., the electronic device 101 in FIG. 3).

According to an embodiment, the electronic device 101 may configure a threshold (e.g., a threshold for the distance sensor 320 in FIG. 3, a reference value at which a collision with an object is predicted to occur, and a distance threshold) in predicting the occurrence of a collision with an object. The electronic device 101 may adaptively adjust a threshold configured on the basis of the user's walking speed and ambient brightness (e.g., illuminance). For example, when the user's walking speed is relatively fast, a distance threshold may increase according to the prediction of the occurrence of a collision with an object. When the walking speed is fast, the processor 120 may increase the reference value at which a collision with an object is predicted to occur, and detect an object that is relatively farther away in advance, thereby increasing the accuracy of the collision prediction. For another example, when the ambient brightness (e.g., illuminance) is relatively low, a distance threshold according to the prediction of the occurrence of a collision with an object may increase. When the ambient brightness is low, the processor 120 may increase the reference value at which a collision with an object is predicted to occur, and detect an object that appears relatively dark in advance, thereby increasing the accuracy of the collision prediction.

With reference to FIG. 4B, at operation 431, the processor 120 may measure the user's walking speed using an inertial sensor (e.g., an acceleration sensor). The processor 120 may identify an amount of change in walking speed, and may increase a distance threshold (e.g., a threshold for the distance sensor 320, a reference value at which a collision with an object is predicted to occur) when the walking speed relatively increases. In contrast, when the walking speed decreases, the processor 120 may decrease the distance threshold. According to an embodiment, the electronic device 101 may adaptively adjust the distance threshold on the basis of the amount of change in the user's walking speed.

At operation 433, the processor 120 may measure ambient brightness information (e.g., a brightness value) using an illuminance sensor (e.g., an illuminance sensor included in the sensor module 176 in FIG. 3, the illuminance sensor 223 in FIG. 2). The processor 120 may identify an amount of change in brightness information, and may increase a distance threshold (e.g., a threshold for the distance sensor 320, a reference value at which a collision with an object is predicted to occur) when there is a relative decrease in brightness information (e.g., a situation in which the surroundings are darkening). In contrast, when the brightness information increases (e.g., a situation in which the surroundings become brighter), the processor 120 may decrease the distance threshold. According to an embodiment, the electronic device 101 may adaptively adjust the distance threshold on the basis of the amount of change in brightness information.

At operation 435, the processor 120 may adjust the distance threshold on the basis of the amount of change in walking speed and the amount of change in brightness information. For example, the processor 120 may adjust the distance threshold so that the distance threshold increases in response to at least one of a situation in which the walking speed increases or a situation in which the brightness information decreases. The processor 120 predicts the possibility of a collision with an object at a relatively long distance, and the accuracy of predicting approximately how many seconds later the collision will occur may increase. For another example, the processor 120 may adjust the distance threshold so that the distance threshold decreases in response to at least one of a situation in which the walking speed decreases or a situation in which the brightness information increases. The processor 120 predicts the possibility of a collision with an object at a relatively short distance, and the accuracy of predicting approximately how many seconds later the collision will occur may increase.

According to an embodiment, the electronic device 101 may adaptively adjust a distance threshold indicative of a spaced distance from an object, on the basis of the user's walking speed and ambient brightness information. The electronic device 101 may adaptively adjust a distance threshold in different situations (e.g., a situation in which the walking speed increases, and a situation in which the user moves from a bright place to a dark place), and the accuracy of collision prediction for an object may increase.

Figure 5A:
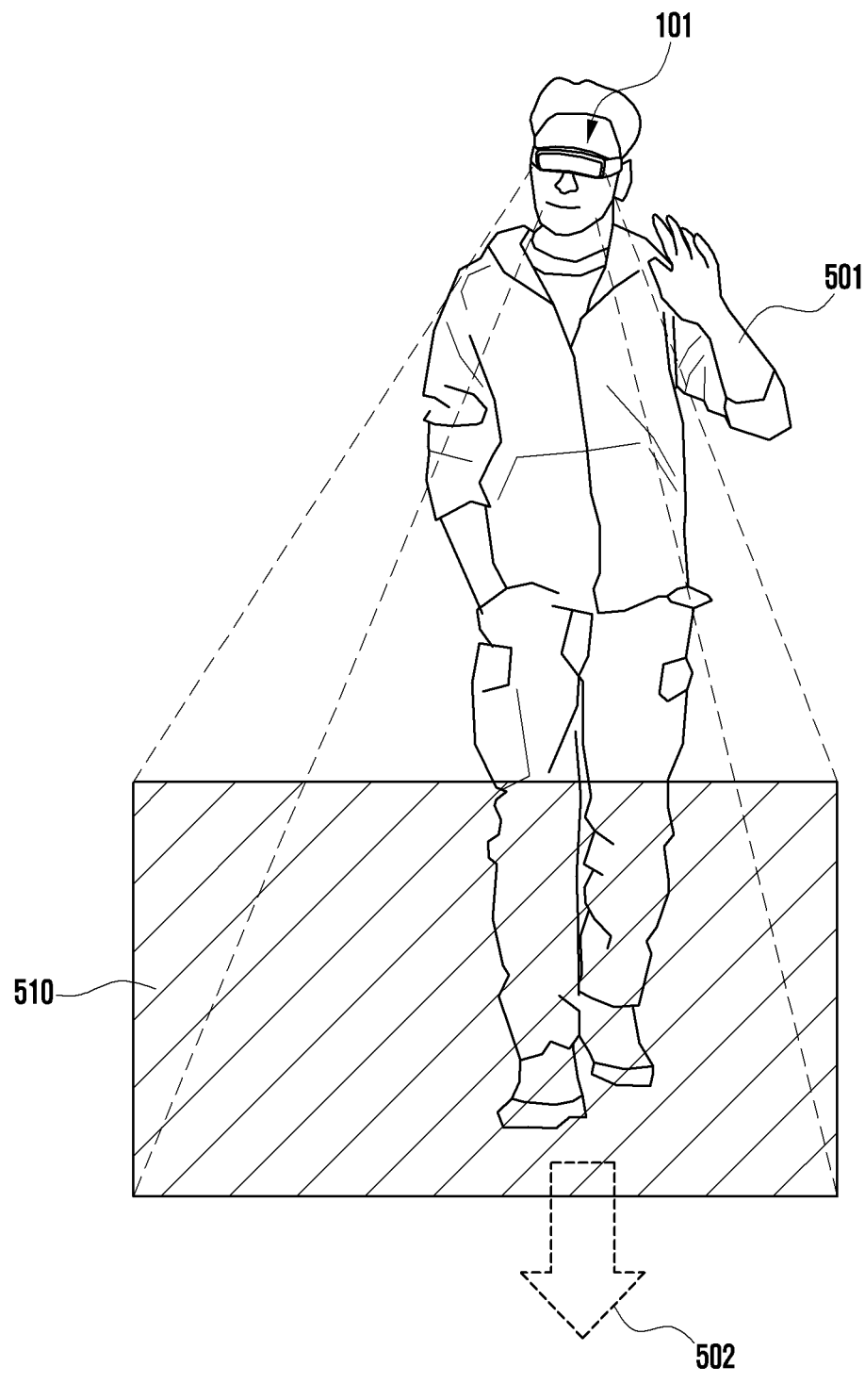
FIG. 5A is an exemplified view illustrating a situation in which a user's movement direction matches a user's gaze direction, according to an embodiment of the disclosure.

FIG. 5A is an exemplified view illustrating a situation in which a user's movement direction matches a user's gaze direction, according to an embodiment of the disclosure.

Figure 5B:
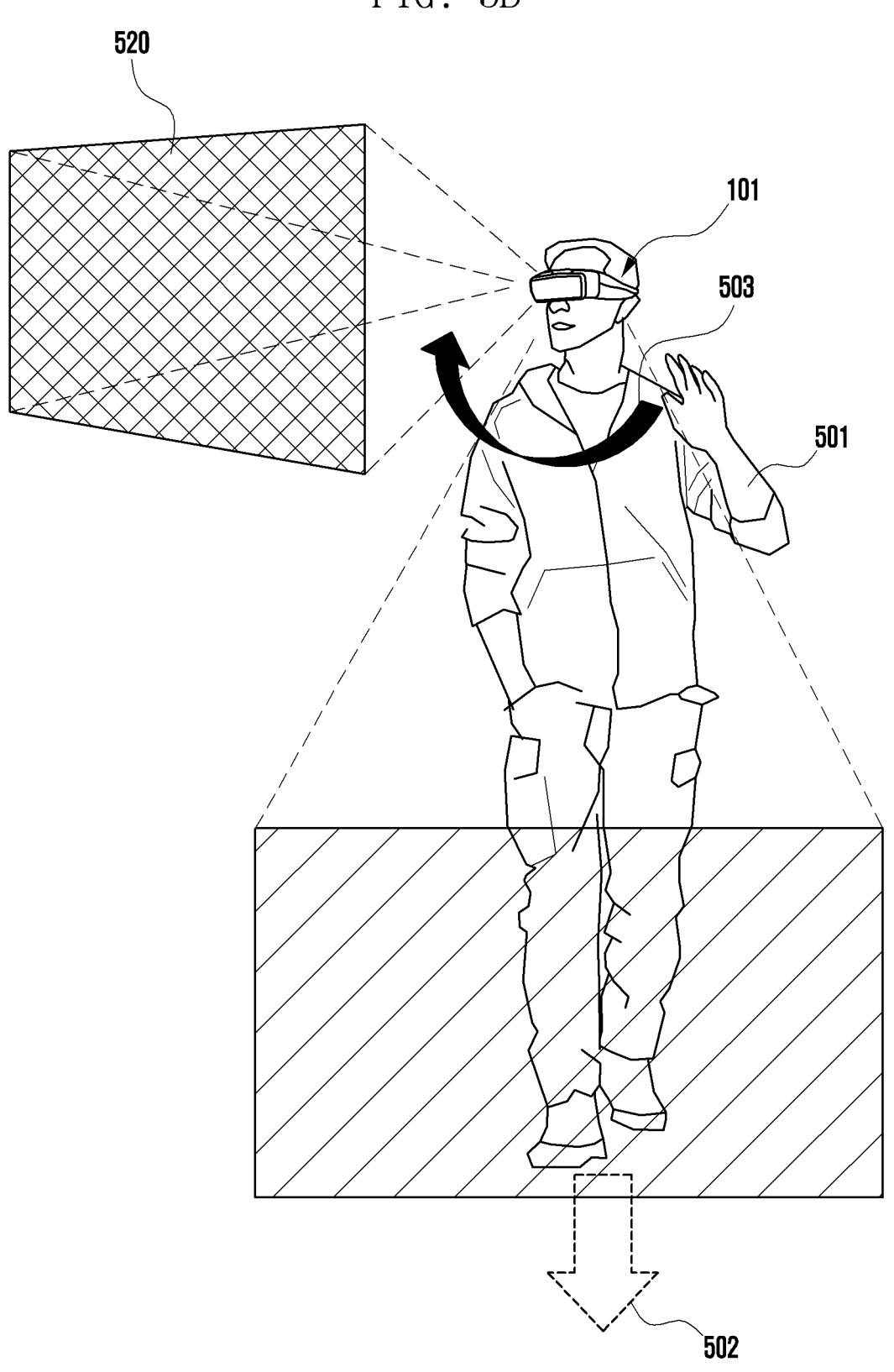
FIG. 5B is an exemplified view illustrating a situation in which a user's movement direction does not match a user's gaze direction, according to an embodiment of the disclosure.

FIG. 5B is an exemplified view illustrating a situation in which a user's movement direction does not match a user's gaze direction, according to an embodiment of the disclosure.

According to an embodiment, an electronic device (e.g., an eyeglasses-type wearable device, and the electronic device 101 in FIG. 3) may include a video see-through (VST) device worn on a user 501's head, and a display module (e.g., the display module 160 in FIG. 3) may be disposed in correspondence to the user 501's gaze. The electronic device 101 may include a camera module (e.g., the camera module 180 in FIG. 3) that takes a picture of the surrounding environment on the basis of the substantially same direction as the user 501's gaze direction.

With reference to FIG. 5A, the electronic device 101 is in a state of being worn on the user 501's head, and may take an image using the camera module 180 along the user 501's gaze direction. For example, the camera module 180 may take a picture of an external environment on the basis of a shooting area 510. FIG. 5A illustrates a situation in which the user 501's movement direction 502 at least partially matches the shooting area 510 of the camera module 180. According to an embodiment, the electronic device 101 may activate at least one distance sensor (e.g., the first distance sensor 211 in FIG. 2 and the distance sensor 320 in FIG. 3) disposed in correspondence to the user 501's movement direction 502. The electronic device 101 may activate at least one distance sensor 320 (e.g., the first distance sensor 211) on the basis of the movement direction 502, and may predict the occurrence of a collision with an object disposed along the movement direction 502.

With reference to FIG. 5B, the electronic device 101 is in a state of being worn on the user 501's head, and may take an image using the camera module 180 in a situation in which the user 501's gaze direction does not match the user 501's movement direction 502. For example, the camera module 180 may take a picture of an external environment on the basis of a shooting area 520. FIG. 5B illustrates a situation in which the user 501's movement direction 502 and the shooting area 520 of the camera module 180 do not match each other. The user 501 moves the head along a first direction 503, and the user's gaze direction may change. According to an embodiment, the electronic device 101 may activate at least one distance sensor (e.g., the third distance sensor 230 in FIG. 2 and the distance sensor 320 in FIG. 3) disposed in correspondence to the user 501's movement direction 502. The electronic device 101 may determine, on the basis of the user 501's gaze direction and the user 501's movement direction 502, the third distance sensor 230 corresponding to the movement direction 502 (e.g., a distance sensor disposed on the left side with respect to the electronic device 101 when the head motion is moved along the first direction 503 to the right side), and may activate the determined third distance sensor 230. The electronic device 101 may activate at least one distance sensor 320 (e.g., the third distance sensor 230) on the basis of the gaze direction and the movement direction 502, and may predict the occurrence of a collision with an object disposed along the movement direction 502.

Figure 6A:
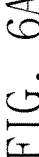
FIG. 6A illustrates a first graph based on raw data measured using an inertial sensor, and a second graph based on a walking signal extracted on the basis of the raw data according to an embodiment of the disclosure.
Figure 6A:
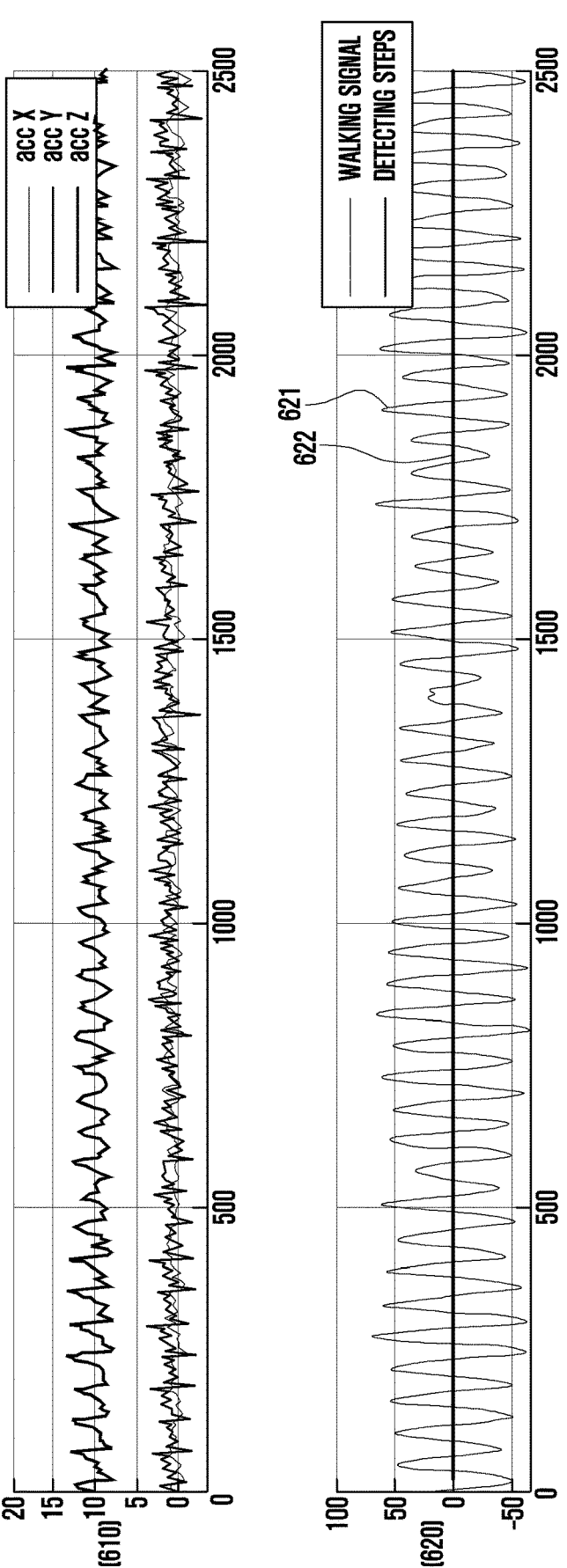

FIG. 6A illustrates a first graph based on raw data measured using an inertial sensor, and a second graph based on a walking signal extracted on the basis of the raw data according to an embodiment of the disclosure.

Figure 6B:
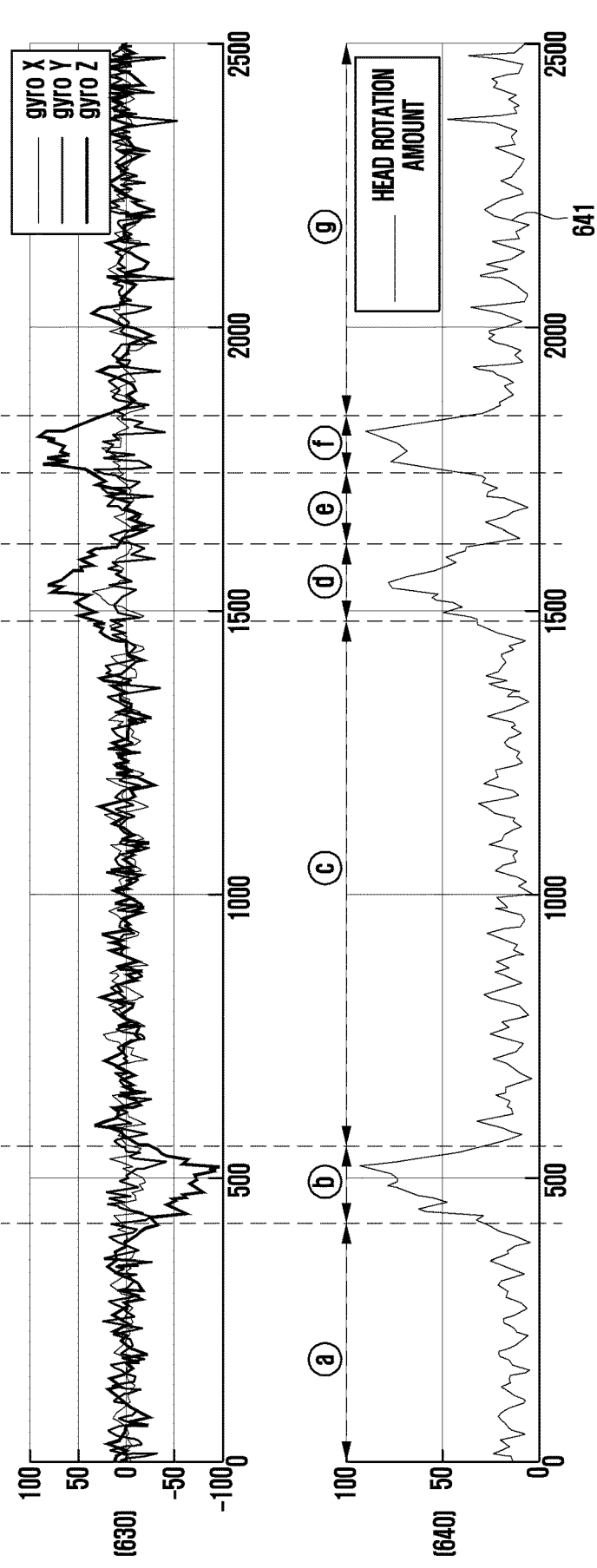
FIG. 6B illustrates a third graph based on raw data measured using an inertial sensor, and a fourth graph based on a head rotation amount extracted on the basis of the raw data according to an embodiment of the disclosure.

FIG. 6B illustrates a third graph based on raw data measured using an inertial sensor, and a fourth graph based on a head rotation amount extracted on the basis of the raw data according to an embodiment of the disclosure.

According to an embodiment, an electronic device (e.g., an eyeglasses-type wearable device, and the electronic device 101 in FIG. 1) may include a video see-through (VST) device worn on a user's head, and a display module (e.g., the display module 160 in FIG. 3) may be disposed in correspondence to the user's gaze. The electronic device 101 may include a camera module (e.g., the camera module 180 in FIG. 3) that takes a picture of the surrounding environment on the basis of the substantially same direction as the user's gaze direction. The electronic device 101 may include an inertial sensor (e.g., the inertial sensor 310 in FIG. 3, an acceleration sensor, and a gyro sensor) for detecting whether the user is walking and the user's head motion (e.g., a state, a direction, a position, and a location of the electronic device 101).

A first graph 610 in FIG. 6A illustrates raw data measured using the inertial sensor 310, and a second graph 620 illustrates a walking signal 621 extracted on the basis of the raw data in the first graph 610. For example, the first graph 610 and the second graph 620 may include the walking signal 621 when the user wearing the electronic device 101 on the head is in a state of walking while looking straight ahead.

According to an embodiment, the first graph 610 may include raw data corresponding to three axis directions (e.g., x-axis, y-axis, and z-axis), measured using an acceleration sensor included in the inertial sensor 310. The x-axis of the first graph 610 may represent time, and the y-axis of the first graph 610 may represent an acceleration value. For example, the law data of the electronic device 101 along the x-axis direction (e.g., the x-axis direction in FIG. 2) may include motion data along the +x direction (left direction) and the −x direction (right direction) with respect to the electronic device 101, the law data of the electronic device 101 along the y-axis direction (e.g., the y-axis direction in FIG. 2) may include motion data along the +y direction (forward direction) and the −y direction (backward direction) with respect to the electronic device 101, and the law data of the electronic device 101 along the z-axis direction (e.g., the z-axis direction in FIG. 2) may include motion data along the +Z direction (upward direction) and the −z direction (downward direction) with respect to the electronic device 101.

According to an embodiment, the second graph 620 represents the walking signal 621, and contact points of the walking signal 621 with a detection line 622 (e.g., a zero-crossing point) may mean one step of the user. The x-axis of the second graph 620 represents time, and the y-axis of the second graph 620 may represent a value of the walking signal 621 measured using the inertial sensor 310. For example, the detection line 622 may mean a line connecting points at which the walking signal 621 switches from a negative (− value) to a positive (+ value) (e.g., a point at which the walking signal 621 has a value of 0 (zero)). With reference to the second graph 620, it may be identified that the user is walking based on a constant speed, as the contact points of the walking signal 621 with the detection line 622 are displayed at designated intervals. The electronic device 101 may configure a threshold for the number of steps of the user, and determine that the user is walking in response to a situation in which the identified number of steps exceeds the threshold.

According to an embodiment, the electronic device 101 may configure the threshold differently depending on a position of the user. For example, in response to a situation in which the user is indoors, the electronic device 101 may configure the threshold (e.g., a threshold number of steps) to be about 5 steps, and in response to a situation in which the user is outdoors, the electronic device 101 may configure the threshold (e.g., a threshold number of steps) to be about 12 steps. The electronic device 101 may determine that the user is walking in response to the number of steps of the user exceeding the threshold. The electronic device 101 may adaptively adjust a reference value (e.g., a threshold, a threshold number of steps) for determining whether the user is walking, depending on the environment in which the user is positioned (e.g., indoors or outdoors).

A third graph 630 in FIG. 6B illustrates raw data measured using the inertial sensor 310, and a fourth graph 640 illustrates a head rotation amount 641 extracted on the basis of the raw data in the third graph 630. For example, the third graph 630 and the fourth graph 640 may include law data based on the motion of the electronic device 101, when the user wearing the electronic device 101 on the head is in a state of walking without looking straight ahead (e.g., a state in which head rotation occurs). The third graph 630 may include raw data corresponding to three axis directions (e.g., x-axis, y-axis, and z-axis), measured using an gyro sensor included in the inertial sensor 310. The x-axis of the third graph 630 may represent time, and the y-axis of the third graph 630 may represent a gyro value (e.g., a gyro value along the x-axis, a gyro value along the y-axis, and a gyro value along the z-axis). The third graph 630 and fourth graph 640 are illustrated in about seven sections (e.g., sections a, b, c, d, e, f, and g). The x-axis of the fourth graph 640 may represent time, and the y-axis of the fourth graph 640 may represent a head rotation amount value.

With reference to the third graph 630, it may be identified that head motions (e.g., changes in gaze direction) occurred in three sections (e.g., section b, section d, and section f). With reference to the fourth graph 640, it may be identified that the user's head rotation has occurred in three sections (e.g., section b, section d, and section f), which is substantially the same as the third graph 630. For example, three sections (e.g., section b, section d, and section f) indicate that the head rotation amount has increased to exceed the designated threshold, and the remaining four sections (e.g., section a, section c, section e, and section g) indicate that the head rotation amount has remained in a state of being the threshold or less. For example, when the designated threshold (e.g., gyro value) is about 50, it may be identified that the head rotation has occurred in section b, section d, and section f. With reference to the fourth graph 640, it may be identified that the gaze direction has changed according to a change in the head rotation amount in three sections (e.g., section b, section d, and section f), and it may be identified that the user is in a state of looking in a specific direction (e.g., a state in which the gaze direction is maintained for a designated period of time) in the remaining four sections (e.g., section a, section c, section e, and section g).

According to an embodiment, the electronic device 101 may identify whether the user is walking and the user's head rotation amount using an inertial sensor (e.g., an acceleration sensor, or a gyro sensor). According to an embodiment, the electronic device 101 may obtain a plurality of images using the camera module 180 in response to a situation in which the user is looking in a specific direction in a state of walking (e.g., a situation in which the head rotation amount is a configured threshold or less). The electronic device 101 may identify the user's movement direction and the user's gaze direction on the basis of the plurality of images obtained.

Figure 7A:
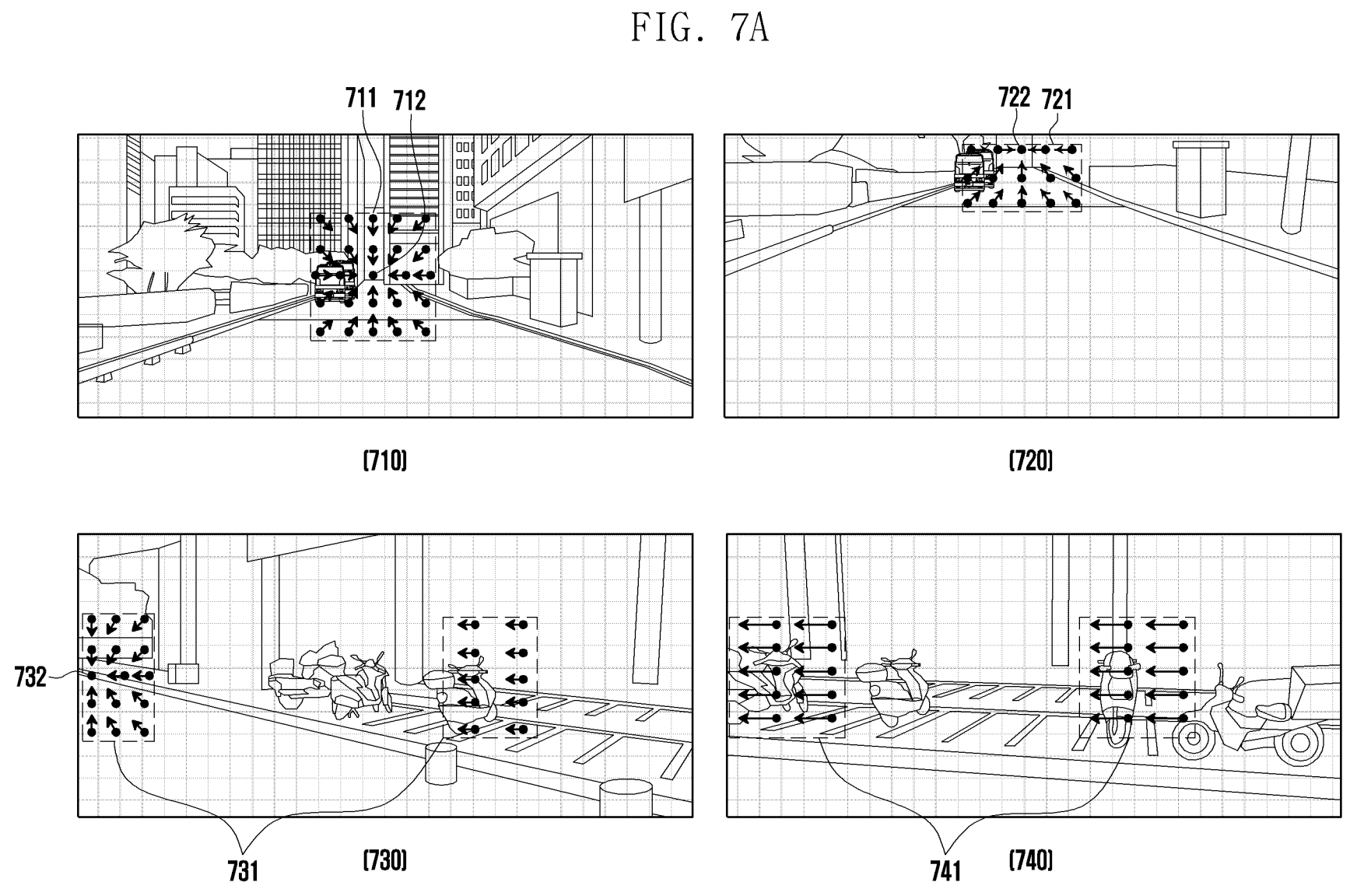

FIG. 7A illustrates various images displayed through a display module on the basis of a movement direction and a gaze direction according to an embodiment of the disclosure.

According to an embodiment, an electronic device (e.g., an eyeglasses-type wearable device, and the electronic device 101 in FIG. 3) may include a video see-through (VST) device worn on a user's head, and a display module (e.g., the display module 160 in FIG. 3) may be disposed in correspondence to the user's gaze. The electronic device 101 may include a camera module (e.g., the camera module 180 in FIG. 3) that takes a picture of the surrounding environment on the basis of the substantially same direction as the user's gaze direction.

Referring to FIG. 7A images of various situations (e.g., a first image 710, a second image 720, a third image 730, and a fourth image 740) taken using the camera module 180. The images illustrated in FIG. 7A may be divided (segmented) into a plurality of blocks according to a predetermined pixel interval (e.g., area, size), and may include vector information (e.g., motion-related vector information) extracted using a block matching method or an optical flow method. The vector information 711, 721, 731, and 741 illustrated in FIG. 7A is not visually displayed on the display module 160, and may be information that is identifiable by a processor (e.g., the processor 120 in FIG. 3) of the electronic device 101.

According to an embodiment, the electronic device 101 may obtain an image when a head rotation condition is satisfied in a situation in which the user is walking (e.g., a condition in which the head rotation amount is a threshold or less, a condition in which the user is looking in a specific direction, and a condition in which the user's head motion is less), and store the obtained image in memory (e.g., the memory 130 in FIG. 3). For example, the obtained image may include an image to which a filter (e.g., a low pass filter, LPF) has been applied so that a noisy motion (e.g., a blurring phenomenon) has been at least partially removed. The electronic device 101 may analyze the images stored in the memory 130, and reflect the analyzed data in vector information on the images.

With reference to FIG. 7A, the first image 710 may be obtained in a situation in which the movement direction and gaze direction of the user are directed toward the frontal direction of the electronic device 101 (e.g., the +y direction in FIG. 2). The first image 710 illustrates a situation in which the movement direction and the gaze direction are substantially the same. With reference to the first image 710, the first image may include first vector information 711 indicative of the user's movement direction. For example, the first vector information 711 may be positioned in an approximately centered area of the first image 710, and may include magnitude information on a vector (e.g., a length of an arrow) and direction information on the vector (e.g., a direction in which the arrow is pointing). The first vector information 711 may include a center point 712 indicative of the user's movement direction and a plurality of arrows being directed toward the center point 712. For example, the center point 712 may be determined to be a center point for one block in which a magnitude of a motion vector is relatively minimal. The center point 712 may be determined to be a centroid pixel for the one block. The processor 120 may identify the user's movement direction (e.g., a direction to the center point 712) and the user's gaze direction on the basis of the first vector information 711.

With reference to FIG. 7A, the second image 720 may be obtained in a situation in which the user's movement direction is directed toward the frontal direction of the electronic device 101 (e.g., the +y direction in FIG. 2), and in a situation in which the user's gaze direction is directed toward the ground. With reference to the second image 720, the second image may include second vector information 721 indicative of the user's movement direction. For example, the second vector information 721 of the second image 720 may show a center point 722 of the movement direction is displayed relatively higher (top) than the first vector information 711 of the first image 710 because the user is in a situation of looking at the ground. The center point 712 of the first image 710 and the center point 722 of the second image 720 may be understood to be substantially the same center point. The processor 120 may identify the user's movement direction (e.g., a direction to the center point 722) and the user's gaze direction (e.g., a direction to the ground) on the basis of the second vector information 721.

With reference to FIG. 7A, the third image 730 may be obtained in a situation in which the user's movement direction is directed toward the frontal direction of the electronic device 101 (e.g., the +y direction in FIG. 2), and in a situation in which the user's gaze direction has moved by about 50 degrees, along the right direction with respect to the electronic device 101. With reference to the third image 730, the third image may include third vector information 731 indicative of the user's movement direction. For example, the third vector information 731 of the third image 730 may show that a center point 732 of the movement direction is displayed on the left side of the third image 730 relative to the first vector information 711 because the user is in a situation of looking at a point of about 50 degrees along the right direction with respect to the electronic device 101. The processor 120 may identify the user's movement direction (e.g., a direction to the center point 732) and the user's gaze direction (e.g., a right direction of about 50 degrees), on the basis of the third vector information 731.

With reference to FIG. 7A, the fourth image 740 may be obtained in a situation in which the user's movement direction is directed toward the frontal direction of the electronic device 101 (e.g., the +y direction in FIG. 2), and in a situation in which the user's gaze direction has moved by about 80 degrees, along the right direction of the electronic device 101. With reference to the fourth image 740, the fourth image may include fourth vector information 741 indicative of the user's movement direction. For example, the fourth vector information 741 of the fourth image 740 may show that a center point of the movement direction (not illustrated) is displayed relatively more skewed to the left side of the fourth image 740 than the third image 730 because the user is in a situation of looking at a point of about 80 degrees along the right direction with respect to the electronic device 101. Since the fourth image 740 has the user's gaze direction skewed more along the right direction with respect to the electronic device 101 than the third image 730, a length (e.g., magnitude of the vector) of the arrow according to the fourth vector information 741 may be displayed relatively longer than the third vector information 731. The processor 120 may identify the user's movement direction (e.g., a direction to the center point) and the user's gaze direction (e.g., a right direction of about 80 degrees), on the basis of the fourth vector information 741.

Figure 7B:
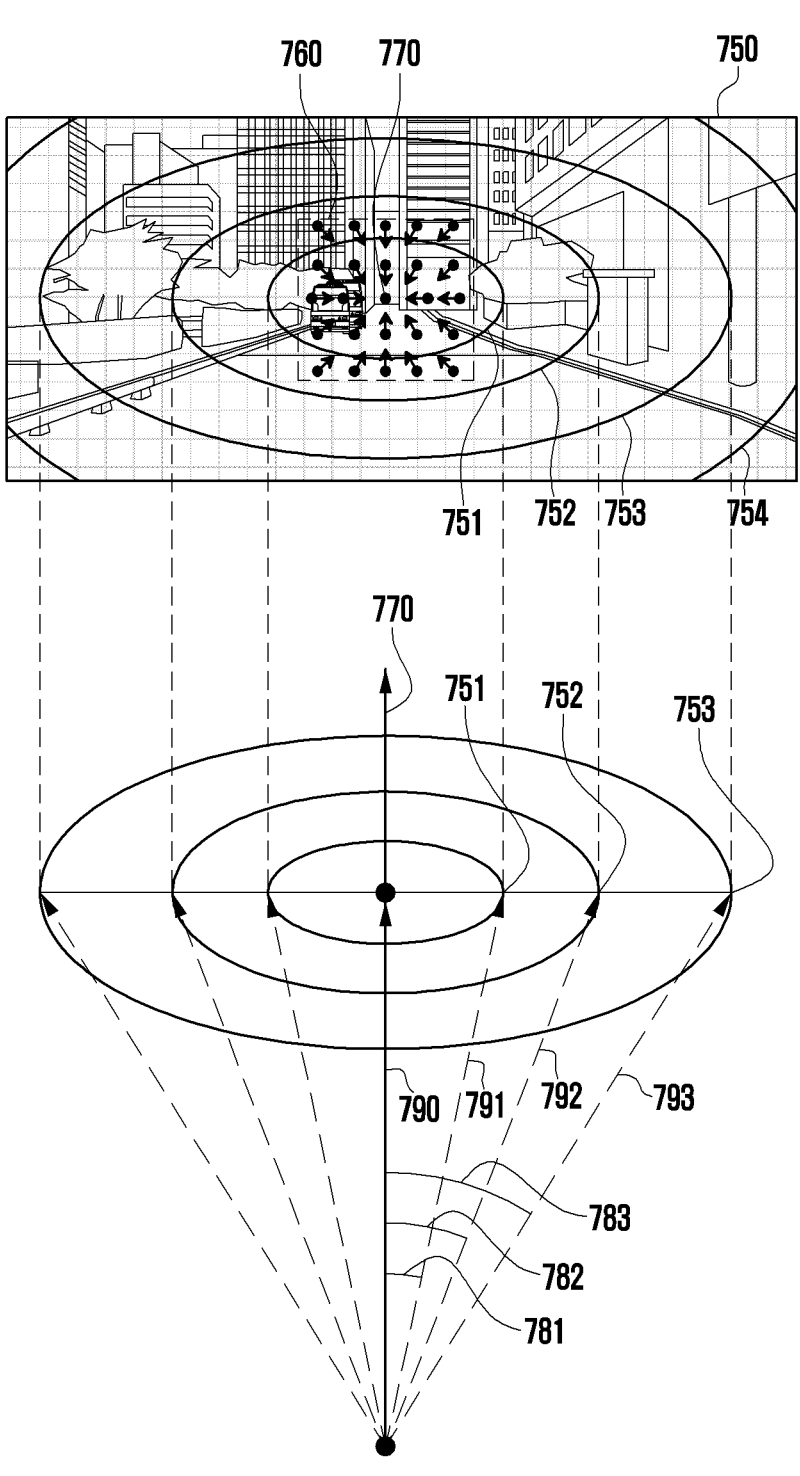
FIG. 7B is an exemplified view illustrating a method of measuring an angle difference between a movement direction and a gaze direction according to an embodiment of the disclosure.

FIG. 7B is an exemplified view illustrating a method of measuring an angle difference between a movement direction and a gaze direction according to an embodiment of the disclosure.

FIG. 7B illustrates an image 750 taken using the camera module 180, in a situation in which the movement direction and gaze direction of the user are directed toward the frontal direction of the electronic device 101 (e.g., the +y direction in FIG. 2). FIG. 7B may be in a situation in which the movement direction and the gaze direction are substantially the same.

The image 750 of FIG. 7B may be in a state in which the image 750 has been divided into a plurality of blocks according to a predetermined pixel interval (e.g., area, size), and vector information has been extracted on the basis of a block matching method and/or an optical flow method. The image 750 of FIG. 7B may include vector information 760 indicative of the user's movement direction. The vector information 760 may be positioned in an approximately centered area of the image 750, and may include magnitude information on a vector (e.g., a length of an arrow) and direction information on the vector (e.g., a direction in which the arrow is pointing). The vector information 760 may include a center point 770 indicative of the user's movement direction and a plurality of arrows being directed toward the center point 770. For example, the center point 770 may be determined to be a center point for one block with a relatively minimal magnitude of a motion vector, and although shown as one point, the center point 770 may be understood as an arrow that substantially corresponds to the user's movement direction. The center point 770 of the vector information 760 may be determined to be a centroid pixel for one block.

The image 750 of FIG. 7B may be divided into a plurality of areas 751, 752, 753, and 754 having the same angle on the basis of a first line 790 corresponding to the center point 770 and a plurality of second lines 791, 792, and 793 corresponding to the user's gaze direction. For example, a first angle 781 (e.g., about 15 degrees) between the first line 790 directed toward the center point 770 and a second-first line 791 corresponding to the user's gaze direction may be determined, and a first area 751 may be formed on the basis of the first angle 781. For another example, a second angle 782 (e.g., about 30 degrees) between the first line 790 directed toward the center point 770 and a second-second line 792 corresponding to the user's gaze direction may be determined, and a second area 752 may be formed on the basis of the second angle 782. A third angle 783 (e.g., about 45 degrees) between the first line 790 directed toward the center point 770 and a second-third line 793 corresponding to the user's gaze direction may be determined, and a third area 753 may be formed on the basis of the third angle 783. According to an embodiment, the electronic device 101 may identify a plurality of areas in which the user's gaze direction has the same angle with respect to the center point 770.

With reference to FIG. 7B, the image 750 may be divided into the first area 751 in which the first angle 781 is formed, the second area 752 in which the second angle 782 is formed, the third area 753 in which the third angle 783 is formed, and/or a fourth area 754 in which a fourth angle (not illustrated) is formed with respect to the center point 770 (e.g., the first line 790). For example, in a situation in which the user's movement direction substantially matches the first line 790 directed toward the center point 770, when the user's gaze direction corresponds to a boundary line of the first area 751 (e.g., the second-first line 791), an angle between the movement direction (e.g., the first line 790) and the gaze direction (e.g., the second-first line 791) may be about 15 degrees (e.g., the first angle 781), and when the user's gaze direction is included within the first area 751, the angle may be within about 15 degrees. For another example, when the user's gaze direction corresponds to a boundary line of the second area 752 (e.g., the second-second line 792), an angle between the movement direction (e.g., the first line 790) and the gaze direction (e.g., the second-second line 792) may be about 30 degrees (e.g., the second angle 782), and when the user's gaze direction is included within the second area 752, the angle may be within about 30 degrees. When the user's gaze direction corresponds to an area between the first area 751 and the second area 752, the user's gaze angle may be included in an angle between about 15 to 30 degrees. For another example, when the user's gaze direction corresponds to a boundary line of the third area 753 (e.g., the second-third line 793), an angle between the movement direction (e.g., the first line 790) and the gaze direction (e.g., the second-third line 793) may be about 45 degrees (e.g., the third angle 783), and when the user's gaze direction is included within the third area 753, the angle may be within about 45 degrees.

According to an embodiment, an image displayed through the display module 160 may be divided into a plurality of blocks at a predetermined pixel interval. The processor 120 of the electronic device 101 may determine one block having a relatively minimal magnitude of the motion vector on the basis of the divided plurality of blocks, and a center point for the determined one block may mean the user's gaze direction. The processor 120 may determine a line corresponding to the user's gaze direction (e.g., the second-first line 791, the second-second line 792, or the second-third line 793) on the basis of the determined one block.

According to an embodiment, the electronic device 101 may generate a look up table and store the look up table in memory (e.g., the memory 130 in FIG. 3) on the basis of each area (e.g., the first area 751, the second area 752, the third area 753, or the fourth area 754) of the plurality of divided areas. Table 1 below is an example of a lookup table.

TABLE 1

| Area with same angle with respect to center point of image (e.g., movement direction) | Angle between movement direction (e.g., first line 790) and gaze direction |
|---|---|
| First area 751 | Within about 15 degrees |
| Second area 752 | Within about 30 degrees |
| Third area 753 | Within about 45 degrees |
| Fourth area 754 | Within about 60 degrees |

According to an embodiment, a block with a minimum magnitude of a motion vector may be determined on the basis of a plurality of images obtained, and a center point of the determined block may be determined to be the user's gaze direction. For example, an angle between a movement direction (e.g., the first line 790) and a gaze direction (e.g., the plurality of second lines 791, 792, and 793) (e.g., the first angle 781, the second angle 782, or the third angle 783) may be an angle formed between the user's movement direction and the user's gaze direction included in the vector information.

According to an embodiment, the electronic device 101 may measure an angle between the user's movement direction and the user's gaze direction, and when the measured angle exceeds a configured threshold, the electronic device 101 may determine that the user is walking while looking in a direction different from the movement direction (e.g., a situation requiring detection of an object disposed along the movement direction). For example, the electronic device 101 may measure an angle between a first line corresponding to the movement direction and a second line corresponding to the gaze direction, in a state in which the threshold is configured to be about 30 degrees, and may determine whether the measured angle exceeds about 30 degrees. The electronic device 101 may activate at least one distance sensor to detect an object disposed along the direction of movement, in response to a situation in which the measured angle exceeds the threshold (e.g., about 30 degrees). According to an embodiment, the electronic device 101 may activate and/or deactivate at least one distance sensor (e.g., the distance sensor 320 in FIG. 3) in response to a situation in which an angle between the movement direction and the gaze direction exceeds a configured threshold.

Figure 8A:
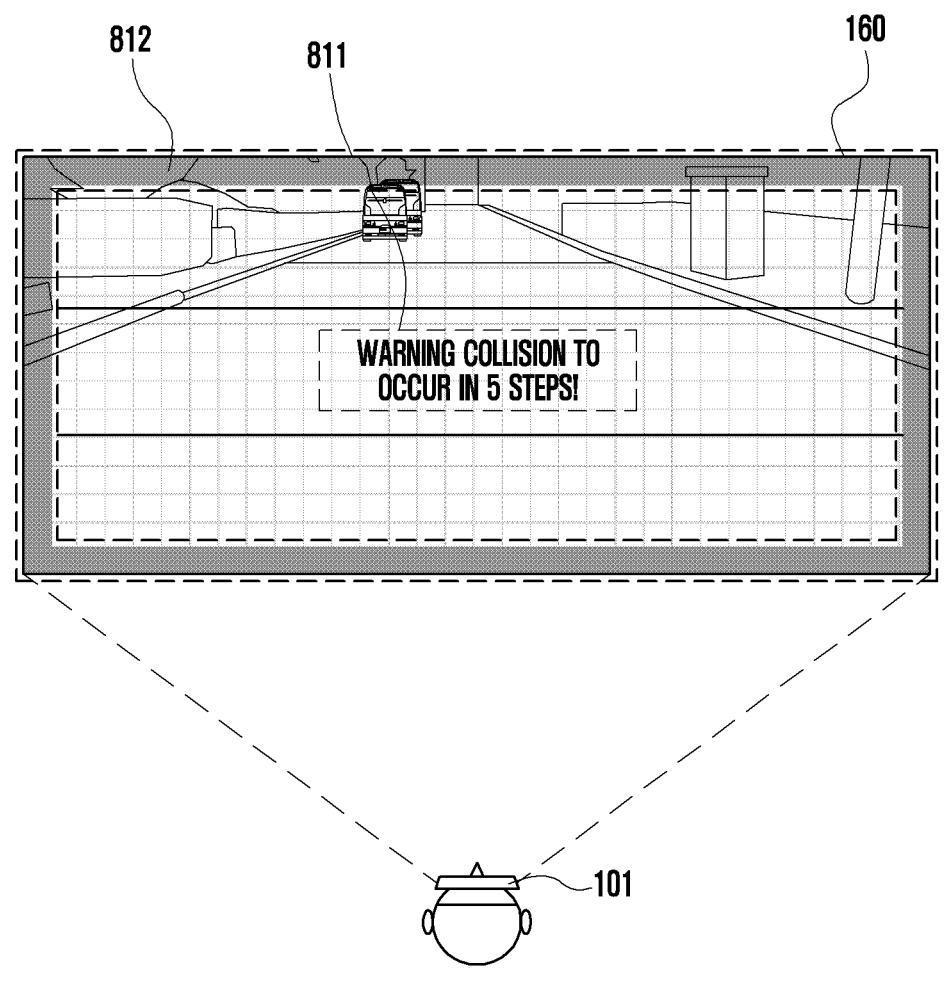
FIG. 8A is a first exemplified view of providing a notification to a user upon predicting a collision, according to an embodiment of the disclosure.

FIG. 8A is a first exemplified view of providing a notification to a user upon predicting a collision, according to an embodiment of the disclosure.

Figure 8B:
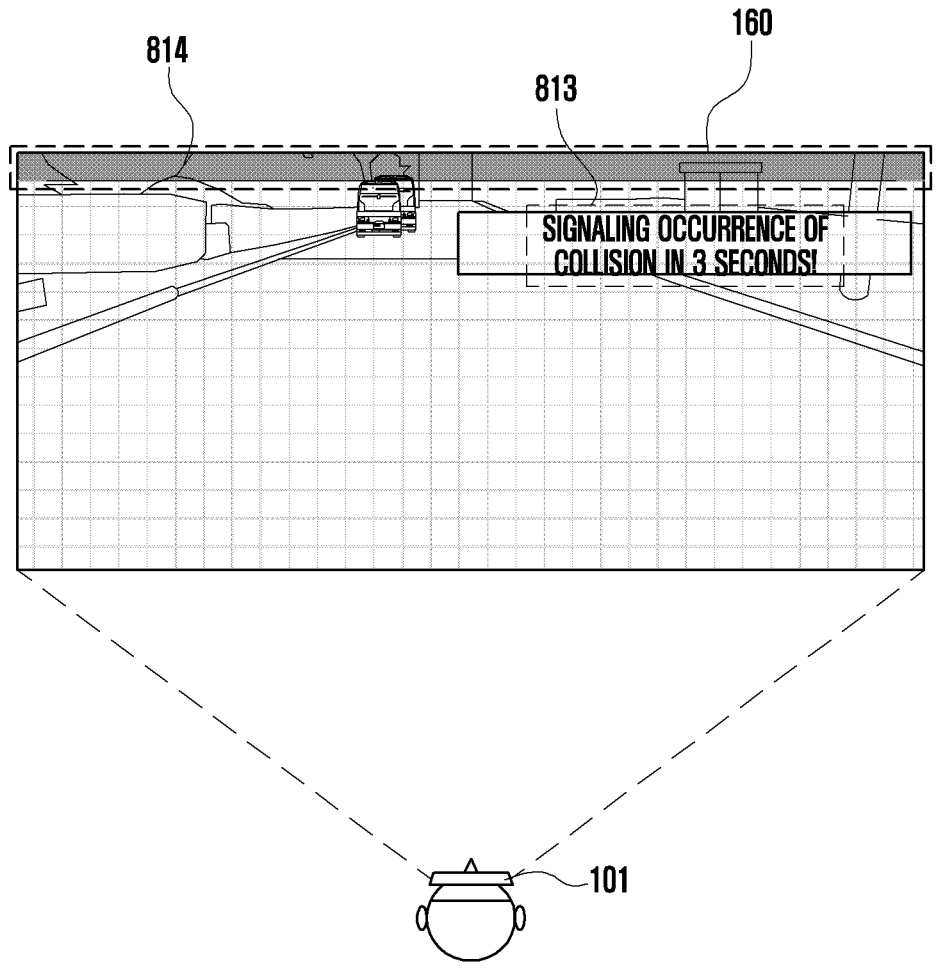
FIG. 8B is a second exemplified view of providing a notification to a user upon predicting a collision, according to an embodiment of the disclosure.

FIG. 8B is a second exemplified view of providing a notification to a user upon predicting a collision, according to an embodiment of the disclosure.

According to an embodiment, an electronic device (e.g., an eyeglasses-type wearable device, and the electronic device 101 in FIG. 1) may include a video see-through (VST) device worn on a user's head, and a display module (e.g., the display module 160 in FIG. 3) may be disposed in correspondence to the user's gaze. The electronic device 101 may include a camera module (e.g., the camera module 180 in FIG. 3) that takes a picture of the surrounding environment on the basis of the substantially same direction as the user's gaze direction.

With reference to FIGS. 8A and 8B, the electronic device 101 is in a state of being worn on the user's head and, and an image taken of the surrounding environment may be displayed through the display module 160. The electronic device 101 may activate at least one distance sensor (e.g., the distance sensor 320 in FIG. 3) to detect the occurrence of a collision with an object disposed in the surrounding environment. A processor (e.g., the processor 120 in FIG. 3) of the electronic device 101 may, using at least one distance sensor 320, identify a spaced distance from an object and, in response to a situation in which the identified distance is a configured threshold or less (e.g., distance threshold), display notification information (e.g., a notification message, a guidance message, and/or a highlight effect) through the display module 160.

With reference to FIG. 8A, the electronic device 101 may display a notification message 811 (e.g., "Warning collision to occur in 5 steps!) when a distance to an object is a distance threshold or less, and generate a highlight effect on an edge area 812 of the image being displayed. For example, the highlight effect may include a visually distinct effect (e.g., a color-changing effect, an image-changing effect, and/or a blinking effect). According to another embodiment, in providing notification information to the user, the electronic device 101 may output an audio signal through an audio module (e.g., the audio module 170 in FIG. 1) for an audible effect, or generate a vibration signal through a haptic module (e.g., the haptic module 179 in FIG. 1) for a tactile effect. With reference to FIG. 8B, the electronic device 101 may move a notification message 813 (e.g., "Signaling a collision to occur in 3 seconds!") to a specific position to display the notification message 813, or may resize the notification message 813. The electronic device 101 may also generate a highlight effect for a portion of the area 814 of the edge of the image being displayed.

According to an embodiment, the electronic device 101 may identify a distance to an object disposed in the surroundings, on the basis of at least one distance sensor 320 that is activated, and may provide notification information to the user when the identified distance is a configured threshold or less. The user may predict the occurrence of a collision with an object, even while wearing the electronic device 101 on the head. The electronic device 101 may activate a first distance sensor disposed in correspondence to the movement direction among the plurality of distance sensors, and may enhance the accuracy of the collision prediction. The electronic device 101 may deactivate, or switch to a low-power mode, a second distance sensor disposed in correspondence to a direction opposite to the movement direction among the plurality of distance sensors, and may reduce power consumption caused by driving the distance sensors.

Figure 9A:
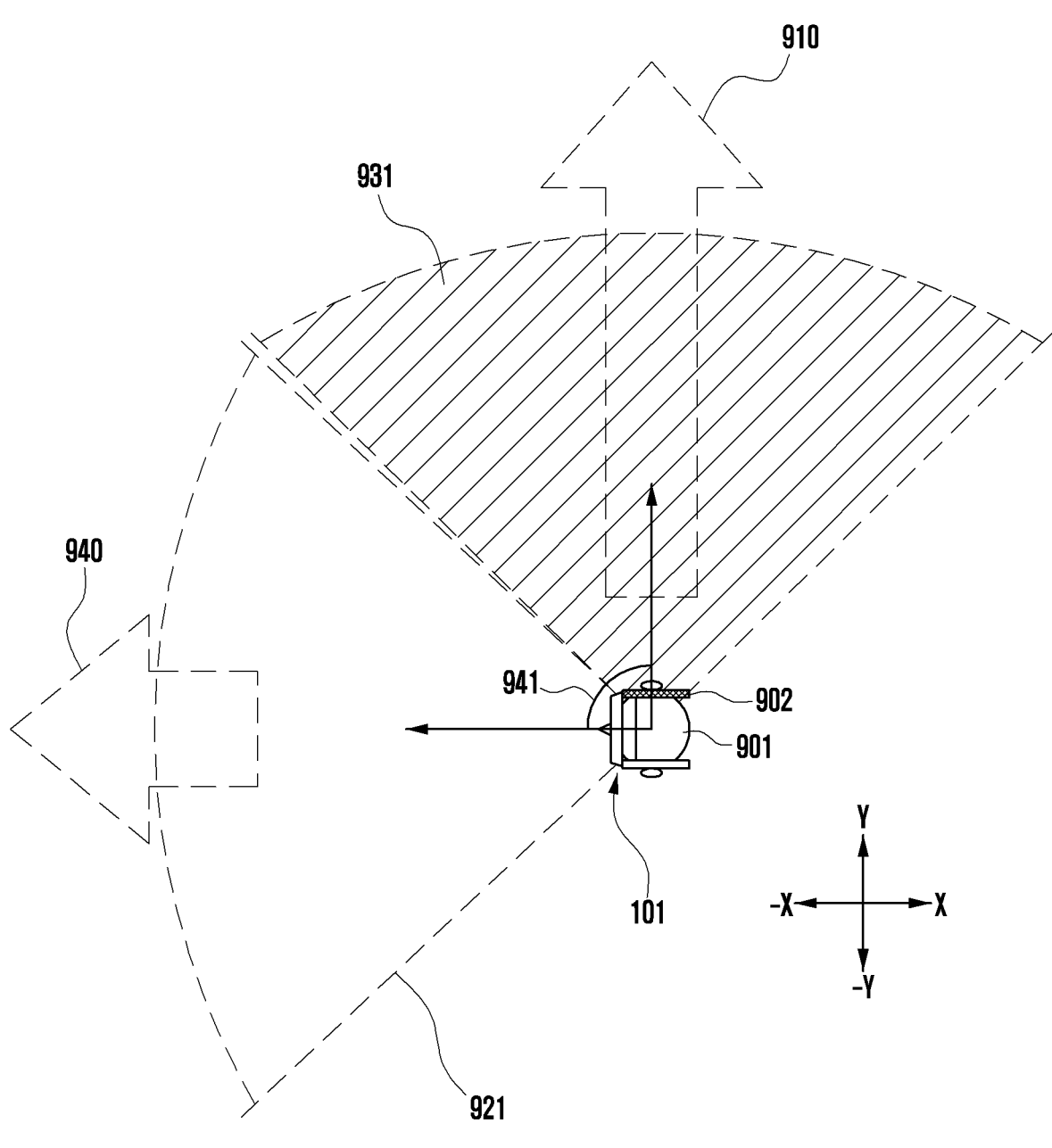
FIG. 9A is a first exemplified view in which at least one distance sensor is activated when an angle difference between a user's movement direction and a user's gaze direction exceeds a threshold, according to an embodiment of the disclosure.

FIG. 9A is a first exemplified view in which at least one distance sensor is activated when an angle difference between a user's movement direction and a user's gaze direction exceeds a threshold, according to an embodiment of the disclosure.

Figure 9B:
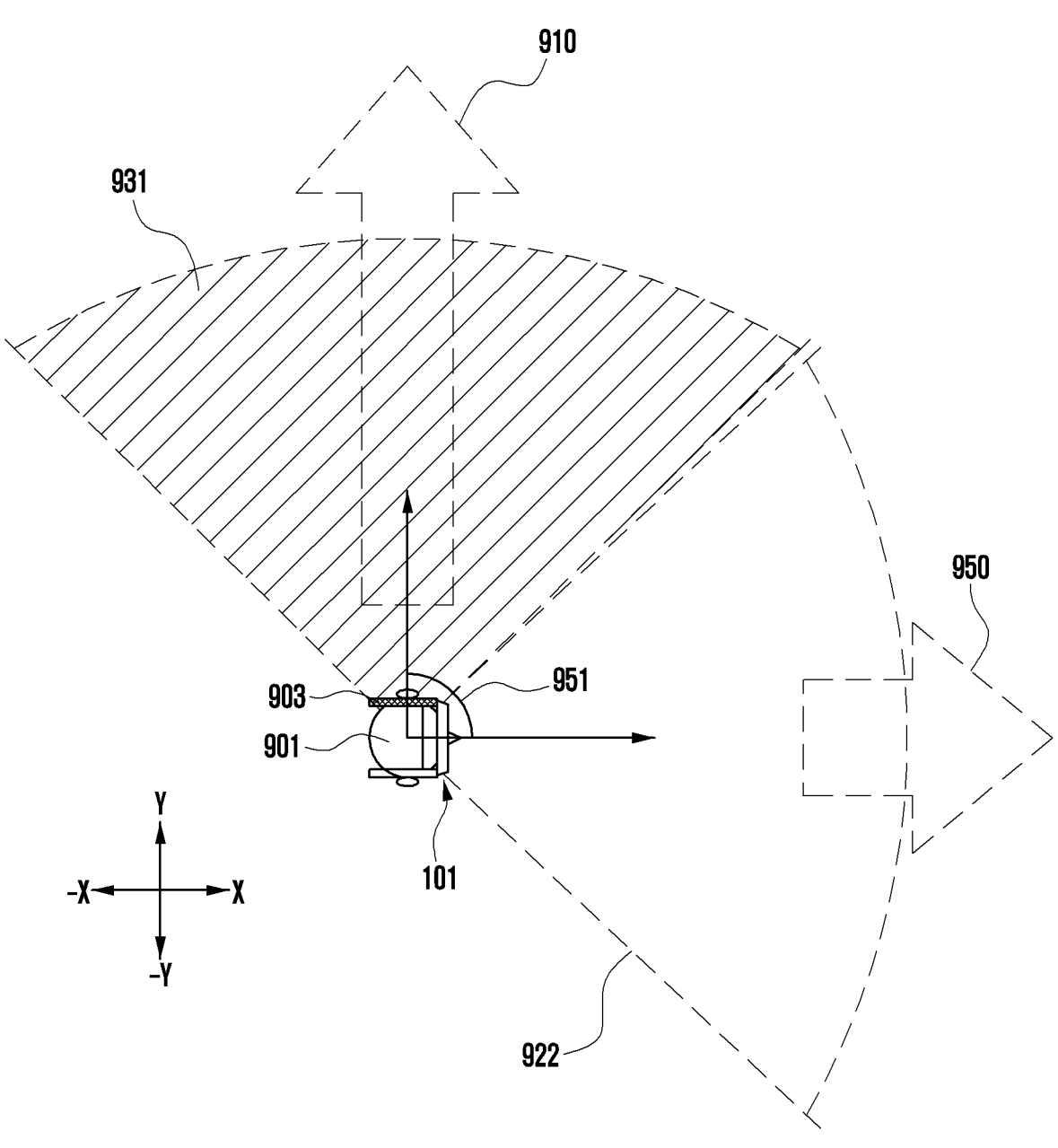
FIG. 9B is a second exemplified view in which at least one distance sensor is activated when an angle difference between a user's movement direction and a user's gaze direction exceeds a threshold, according to an embodiment of the disclosure.

FIG. 9B is a second exemplified view in which at least one distance sensor is activated when an angle difference between a user's movement direction and a user's gaze direction exceeds a threshold, according to an embodiment of the disclosure.

According to an embodiment, an electronic device (e.g., an eyeglasses-type wearable device, and the electronic device 101 in FIG. 1) may include a video see-through (VST) device worn on a user's head, and a display module (e.g., the display module 160 in FIG. 3) may be disposed in correspondence to the user's gaze. The electronic device 101 may include a camera module (e.g., the camera module 180 in FIG. 3) that takes a picture of the surrounding environment on the basis of the substantially same direction as the user's gaze direction.

FIG. 9A illustrates a situation in which a user 901 wearing the electronic device 101 on the head is looking in a left direction 940 (e.g., the –x direction) with respect to the movement direction while moving along a first direction 910 (e.g., the +y direction, the movement direction), and FIG. 9B illustrates a situation in which the user 901 wearing the electronic device 101 on the head is looking in a right direction 950 (e.g., the +x direction) with respect to the movement direction while moving along the first direction 910.

With reference to FIG. 9A, the user 901 may be looking in the left direction 940 (e.g., the –x direction) while moving along the first direction 910 (e.g., the +y direction), and the image taken based on a first range 921 may be displayed through the display module 160 of the electronic device 101. According to an embodiment, the electronic device 101 may activate a first distance sensor 902 (e.g., the second distance sensor 220 in FIG. 2) disposed in correspondence to the movement direction 910 (e.g., the right direction with respect to the electronic device 101) in response to a situation in which an angle 941 between the user's movement direction (e.g., the first direction 910) and gaze direction (e.g., the left direction 940) exceeds a configured threshold. For example, when the threshold is configured to be about 60 degrees, the electronic device 101 may determine whether the angle 941 exceeds about 60 degrees. The electronic device 101 may activate the first distance sensor 902 to predict the occurrence of a collision with an object disposed in a surrounding area 931 along the movement direction 910 (e.g., the +y direction). For another example, the electronic device 101 may deactivate a second distance sensor (e.g., the second distance sensor 903 in FIG. 9B) disposed in correspondence to a direction opposite to the movement direction 910 (e.g., the left direction with respect to the electronic device 101). The electronic device 101 may deactivate a distance sensor disposed in a direction in which the occurrence of a collision with an object is relatively low (e.g., in a direction opposite to the direction in which the electronic device 101 is moving), thereby reducing power consumption.

With reference to FIG. 9B, the user 901 may be looking in the right direction 950 (e.g., the +x direction) while moving along the first direction 910 (e.g., the +y direction), and the image taken based on a second range 922 may be displayed through the display module 160 of the electronic device 101. According to an embodiment, the electronic device 101 may activate a second distance sensor 903 (e.g., the third distance sensor 230 in FIG. 2) disposed in correspondence to the movement direction 910 (e.g., the left direction with respect to the electronic device 101) in response to a situation in which the angle 951 between the user's movement direction (e.g., the first direction 910) and gaze direction (e.g., the right direction 950) exceeds a configured threshold. The electronic device 101 may activate the second distance sensor 903 to predict the occurrence of a collision with an object disposed in the surrounding area 931 along the movement direction 910 (e.g., the +y direction). For another example, the electronic device 101 may deactivate a first distance sensor (e.g., the first distance sensor 902 in FIG. 9A) disposed in correspondence to a direction opposite to the movement direction 910 (e.g., the right direction with respect to the electronic device 101). The electronic device 101 may deactivate a distance sensor disposed in a direction in which the occurrence of a collision with an object is relatively low (e.g., in a direction opposite to the direction in which the electronic device 101 is moving), thereby reducing power consumption.

In a method of activating a distance sensor (e.g., the first distance sensor 211, the second distance sensor 220, and the third distance sensor 230 in FIG. 2, and the distance sensor 320 in FIG. 3) in an electronic device (e.g., the electronic device 101 in FIG. 1), according to various embodiments, an inertial sensor (e.g., the inertial sensor 310 in FIG. 3) may be used to identify whether the user wearing the electronic device 101 on the head is walking. In the method according to an embodiment, a user's head rotation amount may be detected using the inertial sensor 310 in response to the user being walking. In the method according to an embodiment, a plurality of images may be obtained through a camera module (e.g., the camera module 180 in FIG. 3) on the basis of satisfying a head rotation condition based on the head rotation amount. In the method according to an embodiment, an angle may be measured between a user's movement direction and the user's gaze direction on the basis of the plurality of images obtained. In the method according to an embodiment, at least one first distance sensor corresponding to the movement direction may be activated, among the plurality of distance sensors, when the measured angle exceeds a threshold.

According to an embodiment, the electronic device 101 may include a head mounted display (HMD) device worn on a user's head, and the display module 160 may be disposed in correspondence to a position of the user's eyes.

According to an embodiment, the plurality of distance sensors 320 may measure a distance to an object disposed in an external environment, and may include at least one sensor from among an infrared sensor, an ultrasonic sensor, and a LiDAR sensor.

In the method according to an embodiment, at least one second distance sensor corresponding to the direction opposite to the movement direction, may be deactivated, or operated in a low power mode, from among the plurality of distance sensors 320 when the measured angle exceeds a threshold.

According to an embodiment, the plurality of images obtained may be divided into a plurality of blocks according to a predetermined pixel interval, and may include vector information extracted on the basis of the plurality of blocks.

In an operation of measuring an angle between a movement direction and a gaze direction, according to an embodiment, the movement direction and the gaze direction may be identified on the basis of vector information corresponding to a plurality of images, and an angle formed between the movement direction and the gaze direction may be measured.

In the method according to an embodiment, a distance to an object disposed along the movement direction may be identified using at least one first distance sensor that is activated. In the method according to an embodiment, notification information may be generated when the identified distance is equal to or less than a distance threshold.

In the method according to an embodiment, a user's walking speed may be measured using the inertial sensor 310. In the method according to an embodiment, ambient brightness information may be obtained using an illuminance sensor. In the method according to an embodiment, a distance threshold may be adjusted on the basis of the walking speed and ambient brightness information.

In the method according to an embodiment, a user's head rotation amount may be detected using the inertial sensor 310 in response to the user not being walking. In the method according to an embodiment, a plurality of images may be obtained through the camera module 180 on the basis of satisfying a head rotation condition based on a head rotation amount. In the method according to an embodiment, a user's gaze direction may be identified on the basis of the plurality of images obtained. In the method according to an embodiment, at least one distance sensor of the plurality of distance sensor 320 may be activated on the basis of the identified gaze direction.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. It is intended that features described with respect to separate embodiments, or features recited in separate claims, may be combined unless such a combination is explicitly specified as being excluded or such features are incompatible. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
a plurality of distance sensors;
an inertial sensor;
a camera;
a display;
memory storing one or more computer programs; and
a processor operatively connected to the plurality of distance sensors, the inertial sensor, the camera, the display, and the memory,
wherein the one or more computer programs include computer-executable instructions that, when executed by the processor, cause the electronic device to:
identify, using the inertial sensor, whether a user wearing the electronic device on their head is walking,
detect, in response to the user walking, a head rotation amount of the user using the inertial sensor,
obtain a plurality of images through the camera on the basis of satisfying a head rotation condition based on the head rotation amount, measure an angle between a movement direction of the user and a gaze direction of the user on the basis of the plurality of images that are obtained, and
activate, among the plurality of distance sensors, at least one first distance sensor corresponding to the movement direction, when the measured angle exceeds a threshold.
2. The electronic device of claim 1,
wherein the electronic device includes a head mounted display (HMD) device worn on the head of the user, and
wherein the display is disposed in correspondence to a position of eyes of the user.
3. The electronic device of claim 1, wherein the one or more computer programs further include computer-executable instructions that, when executed by the processor, cause the electronic device to:
take an image through the camera along a direction that is substantially the same as the gaze direction of the user,
convert the taken image using an image sensor of the camera, and
display the converted image through the display.
4. The electronic device of claim 1, wherein the plurality of distance sensors is capable of measuring a distance to an object disposed in an external environment and includes at least one sensor of an infrared sensor, an ultrasonic sensor, or a LiDAR sensor.
5. The electronic device of claim 1, wherein the one or more computer programs further include computer-executable instructions that, when executed by the processor, cause the electronic device to:
deactivate, or operate in a low power mode, at least one second distance sensor corresponding to a direction opposite to the movement direction, among the plurality of distance sensors, when the measured angle exceeds a threshold.
6. The electronic device of claim 1,
wherein the one or more computer programs further include computer-executable instructions that, when executed by the processor, cause the electronic device to:
identify the movement direction and the gaze direction on the basis of vector information corresponding to the plurality of images, and
measure an angle formed between the movement direction and the gaze direction, and
wherein the obtained plurality of images are divided into a plurality of blocks according to a predetermined pixel interval, and includes vector information extracted on the basis of the plurality of blocks.
7. The electronic device of claim 1, wherein the one or more computer programs further include computer-executable instructions that, when executed by the processor, using the activated at least one first distance sensor, cause the electronic device to:
identify a distance to an object disposed along the movement direction, and
generate notification information when the identified distance is a distance threshold or less.
8. The electronic device of claim 7, further comprising:
an illuminance sensor,
wherein the one or more computer programs further include computer-executable instructions that, when executed by the processor, using the inertial sensor, cause the electronic device to:
measure a walking speed of the user, obtain ambient brightness information using the illuminance sensor, and adjust the distance threshold on the basis of the walking speed and the ambient brightness information.

9. The electronic device of claim 7, wherein the notification information includes at least one of an indication of a notification message, an indication of a guidance message, a visual effect, an audible effect, or a tactile effect.

10. The electronic device of claim 1, wherein the one or more computer programs further include computer-executable instructions that, when executed by the processor, in response to the user not walking, cause the electronic device to:

detect a head rotation amount of the user using the inertial sensor, obtain a plurality of images through the camera on the basis of satisfying a head rotation condition based on the head rotation amount, identify the gaze direction of the user on the basis of the plurality of images that are obtained, and activate at least one distance sensor of the plurality of distance sensors on the basis of the identified gaze direction.

11. A method for activating a distance sensor in an electronic device, the method comprising:

identifying, using an inertial sensor, whether a user wearing the electronic device on their head is walking;

detecting, in response to the user walking, a head rotation amount of the user using the inertial sensor;

obtaining a plurality of images through a camera on the basis of satisfying a head rotation condition based on the head rotation amount;

measuring an angle between a movement direction of the user and a gaze direction of the user on the basis of the plurality of images that are obtained; and activating, among a plurality of distance sensors, at least one first distance sensor corresponding to the movement direction when the measured angle exceeds a threshold.

12. The method of claim 11, further comprising:

deactivating, or operating in a low power mode, at least one second distance sensor corresponding to a direction opposite to the movement direction, among the plurality of distance sensors when the measured angle exceeds the threshold.

13. The method of claim 11, wherein the measuring of an angle between the movement direction and the gaze direction includes:

identifying the movement direction and the gaze direction on the basis of vector information corresponding to the plurality of images; and measuring an angle formed between the movement direction and the gaze direction.

14. The method of claim 11, further comprising:

identifying a distance to an object disposed along the movement direction using the activated at least one first distance sensor;

generating notification information when the identified distance is a distance threshold or less;

measuring, using the inertial sensor, a walking speed of the user;

obtaining, using an illuminance sensor, ambient brightness information; and adjusting the distance threshold on the basis of the walking speed and the ambient brightness information.

15. The method of claim 11, further comprising:

detecting, in response to the user not walking, a head rotation amount of the user using the inertial sensor;

obtaining a plurality of images through the camera on the basis of satisfying a head rotation condition based on the head rotation amount;

identifying a gaze direction of the user on the basis of the plurality of images that are obtained; and activating, among the plurality of distance sensors, at least one distance sensor on the basis of the identified gaze direction.

16. The method of claim 11, the method further comprising:

taking an image, using the camera, along a direction that is substantially the same as the gaze direction of the user;

converting the taken image; and displaying the converted image.

17. The method of claim 11, wherein the plurality of distance sensors is capable of measuring a distance to an object disposed in an external environment and includes at least one sensor of an infrared sensor, an ultrasonic sensor, or a LiDAR sensor.

18. The method of claim 11, wherein the obtained plurality of images are divided into a plurality of blocks according to a predetermined pixel interval, and include vector information extracted on a basis of the plurality of blocks.

19. One or more non-transitory computer-readable storage media storing one or more computer programs including computer-executable instructions that, when executed by one or more processors of an electronic device individually or collectively, cause the electronic device to perform operations, the operations comprising:

identifying, using an inertial sensor, whether a user wearing the electronic device on their head is walking;

detecting, in response to the user walking, a head rotation amount of the user using the inertial sensor;

obtaining a plurality of images through a camera on the basis of satisfying a head rotation condition based on the head rotation amount;

measuring an angle between a movement direction of the user and a gaze direction of the user on the basis of the plurality of images that are obtained; and activating, among a plurality of distance sensors, at least one first distance sensor corresponding to the movement direction when the measured angle exceeds a threshold.

20. The one or more non-transitory computer-readable storage media of claim 19, the operations further comprising:

deactivating, or operating in a low power mode, at least one second distance sensor corresponding to a direction opposite to the movement direction, among the plurality of distance sensors when the measured angle exceeds the threshold.

* * * * *